US011418971B2

(12) United States Patent
Brechko et al.

(10) Patent No.: US 11,418,971 B2
(45) Date of Patent: Aug. 16, 2022

(54) BEAMFORMING INTEGRATED CIRCUIT, AESA SYSTEM AND METHOD

(71) Applicant: Anokiwave, Inc., San Diego, CA (US)

(72) Inventors: Pavel Brechko, San Diego, CA (US); David W. Corman, Gilbert, AZ (US); Vipul Jain, San Diego, CA (US); Shamsun Nahar, San Diego, CA (US); Jason Durbin, San Diego, CA (US); Nitin Jain, San Diego, CA (US)

(73) Assignee: Anokiwave, Inc., San Diego, CA (US)

( * ) Notice: Subject to any disclaimer, the term of this patent is extended or adjusted under 35 U.S.C. 154(b) by 350 days.

(21) Appl. No.: 16/231,799

(22) Filed: Dec. 24, 2018

(65) Prior Publication Data
US 2019/0274055 A1 Sep. 5, 2019
US 2021/0235282 A2 Jul. 29, 2021

Related U.S. Application Data

(60) Provisional application No. 62/610,227, filed on Dec. 24, 2017.

(51) Int. Cl.
H04W 16/28 (2009.01)
H04B 7/06 (2006.01)
H04B 7/10 (2017.01)
H04W 4/00 (2018.01)
H01Q 21/06 (2006.01)

(52) U.S. Cl.
CPC .......... *H04W 16/28* (2013.01); *H04B 7/0617* (2013.01); *H04B 7/10* (2013.01); *H04W 4/00* (2013.01); *H01Q 21/065* (2013.01)

(58) Field of Classification Search
CPC .... H04W 16/28; H04B 7/0617; H01Q 21/065
See application file for complete search history.

(56) References Cited

U.S. PATENT DOCUMENTS

| | | | |
|---|---|---|---|
| 2,982,959 A | 5/1961 | Hanneken | |
| 3,483,563 A | 12/1969 | Schroeder | |
| 5,027,125 A | 6/1991 | Tang | |
| 5,068,668 A | 11/1991 | Tsuda et al. | |

(Continued)

FOREIGN PATENT DOCUMENTS

| | | |
|---|---|---|
| WO | 1995025409 A1 | 9/1995 |
| WO | 2017078851 A2 | 5/2017 |
| WO | 2017185979 A1 | 11/2017 |
| WO | 2018028310 A1 | 2/2018 |
| WO | 2018119153 A2 | 6/2018 |

OTHER PUBLICATIONS

Bailey, "General Layout Guidelines for RF and Mixed-Signal PCBs," Maxim Integrated, Tutorial 5100, 10 pages, Sep. 14, 2011.

(Continued)

*Primary Examiner* — Thomas M Hammond, III
(74) *Attorney, Agent, or Firm* — Nutter McClennen & Fish LLP

(57) ABSTRACT

A beamforming integrated circuit system is configured to optimize performance. Among other things, the system may run at a lower power than conventional integrated circuits, selectively disable branches to control certain system functions, and/or selectively position ground pads around receiving pads to enhance isolation. The system also may use a beamforming integrated circuit as a distribution circuit for a number of similar or like beamforming integrated circuits.

63 Claims, 15 Drawing Sheets

(56) References Cited

U.S. PATENT DOCUMENTS

| | | |
|---|---|---|
| 5,381,157 A | 1/1995 | Shiga |
| 5,448,250 A | 9/1995 | Day |
| 5,554,995 A | 9/1996 | Jun |
| 5,568,158 A | 10/1996 | Gould |
| 5,648,955 A | 7/1997 | Jensen et al. |
| 5,724,666 A | 3/1998 | Dent |
| 5,949,376 A | 9/1999 | McDonald et al. |
| 5,959,980 A | 9/1999 | Scott |
| 5,982,329 A | 11/1999 | Pittman et al. |
| 6,002,370 A | 12/1999 | Mckinnon et al. |
| 6,067,053 A | 5/2000 | Runyon et al. |
| 6,166,705 A | 12/2000 | Mast et al. |
| 6,252,559 B1 | 6/2001 | Donn |
| 6,411,258 B1 | 6/2002 | Ho |
| 6,411,824 B1 | 6/2002 | Eidson |
| 6,519,478 B1 | 2/2003 | Scherzer et al. |
| 6,611,231 B2 | 8/2003 | Crilly, Jr. et al. |
| 6,686,885 B1 * | 2/2004 | Barkdoll ............. H01P 1/184 342/372 |
| 6,760,603 B1 | 7/2004 | Scherzer et al. |
| 6,995,712 B2 | 2/2006 | Boyanov |
| 7,027,454 B2 | 4/2006 | Dent |
| 7,062,245 B2 | 6/2006 | Miyano et al. |
| 7,087,993 B2 | 8/2006 | Lee |
| 7,129,568 B2 | 10/2006 | Lee et al. |
| 7,327,317 B2 | 2/2008 | Heiniger |
| 7,372,911 B1 | 5/2008 | Lindskog et al. |
| 7,538,740 B2 | 5/2009 | Korisch et al. |
| 7,656,342 B2 | 2/2010 | Stolarczyk et al. |
| 7,894,768 B2 | 2/2011 | Ding et al. |
| 8,031,117 B2 | 10/2011 | Goldberg |
| 8,098,198 B2 | 1/2012 | Thiesen et al. |
| 8,120,537 B2 | 2/2012 | del Rio et al. |
| 8,160,530 B2 | 4/2012 | Corman et al. |
| 8,352,040 B2 | 1/2013 | Von Arx et al. |
| 8,385,305 B1 | 2/2013 | Negus et al. |
| 8,558,398 B1 | 10/2013 | Seetharam |
| 8,558,735 B2 | 10/2013 | Bachmann et al. |
| 8,587,492 B2 | 11/2013 | Runyon |
| 8,633,856 B2 | 1/2014 | Rao |
| 8,649,418 B1 | 2/2014 | Negus et al. |
| 8,665,846 B2 | 3/2014 | O'Keefe |
| 8,737,190 B2 | 5/2014 | Yong et al. |
| 8,792,820 B2 | 7/2014 | Grotz |
| 8,817,672 B2 | 8/2014 | Corman et al. |
| 8,838,036 B2 | 9/2014 | Yoon et al. |
| 8,866,283 B2 | 10/2014 | Chen et al. |
| 8,872,719 B2 | 10/2014 | Warnick |
| 8,989,762 B1 | 3/2015 | Negus et al. |
| 9,077,413 B2 | 7/2015 | Hawryluck et al. |
| 9,088,388 B2 | 7/2015 | Alamouti et al. |
| 9,094,102 B2 | 7/2015 | Corman et al. |
| 9,118,361 B2 | 8/2015 | Barker et al. |
| 9,203,161 B2 | 12/2015 | Orihashi et al. |
| 9,276,321 B2 | 3/2016 | Smith et al. |
| 9,285,461 B2 | 3/2016 | Swirhun et al. |
| 9,293,835 B2 | 3/2016 | Clymer et al. |
| 9,306,291 B2 | 4/2016 | Lu et al. |
| 9,368,880 B2 | 6/2016 | Solondz |
| 9,520,637 B2 | 12/2016 | Monte et al. |
| 9,520,655 B2 | 12/2016 | Cerreno |
| 9,680,234 B2 | 6/2017 | Love et al. |
| 9,705,611 B1 | 7/2017 | West |
| 9,712,216 B2 | 7/2017 | Lea et al. |
| 9,753,118 B2 | 9/2017 | Sanderovich et al. |
| 9,768,513 B2 | 9/2017 | Lee et al. |
| 9,806,422 B2 | 10/2017 | Garcia et al. |
| 9,853,358 B2 | 12/2017 | Wu et al. |
| 9,929,886 B2 | 3/2018 | Amadjikpe et al. |
| 9,935,663 B1 | 4/2018 | Rofougaran et al. |
| 10,020,555 B2 | 7/2018 | Sarkar et al. |
| 10,116,066 B2 | 10/2018 | Schaepperle |
| 10,135,501 B2 | 11/2018 | Lea et al. |
| 10,181,888 B2 | 1/2019 | Wei et al. |
| 10,218,426 B1 | 2/2019 | Sano et al. |
| 10,298,275 B2 | 5/2019 | Gharavi et al. |
| 10,439,675 B2 | 10/2019 | Johnson et al. |
| 10,468,781 B1 | 11/2019 | Paulsen et al. |
| 10,686,258 B2 | 6/2020 | Zihir et al. |
| 10,742,288 B2 | 8/2020 | McMorrow et al. |
| 10,826,195 B2 | 11/2020 | Madsen et al. |
| 10,854,995 B2 | 12/2020 | Rofougaran et al. |
| 10,998,640 B2 | 5/2021 | Carey et al. |
| 11,011,853 B2 | 5/2021 | Corman et al. |
| 2002/0102948 A1 | 8/2002 | Stanwood et al. |
| 2004/0157645 A1 | 8/2004 | Smith et al. |
| 2005/0017352 A1 | 1/2005 | Lee |
| 2005/0063353 A1 | 3/2005 | Anderson et al. |
| 2005/0082645 A1 | 4/2005 | Lee et al. |
| 2005/0098860 A1 | 5/2005 | Lai et al. |
| 2005/0243527 A1 | 11/2005 | Jandzio et al. |
| 2006/0006505 A1 | 1/2006 | Chiang et al. |
| 2006/0014491 A1 | 1/2006 | Cleveland |
| 2007/0152882 A1 | 7/2007 | Hash et al. |
| 2007/0274249 A1 | 11/2007 | Hulbert et al. |
| 2008/0119190 A1 | 5/2008 | Karabinis |
| 2008/0150800 A1 | 6/2008 | Tsuji |
| 2008/0218424 A1 | 9/2008 | Blanton |
| 2008/0246680 A1 | 10/2008 | Rawnick et al. |
| 2009/0256752 A1 | 10/2009 | Akkermans et al. |
| 2010/0099370 A1 | 4/2010 | Nichols et al. |
| 2010/0194663 A1 | 8/2010 | Rothwell et al. |
| 2010/0260076 A1 | 10/2010 | Corman et al. |
| 2010/0261440 A1 | 10/2010 | Corman et al. |
| 2011/0001678 A1 | 1/2011 | Hsu et al. |
| 2011/0090129 A1 | 4/2011 | Weily et al. |
| 2011/0175789 A1 | 7/2011 | Lee et al. |
| 2011/0198742 A1 | 8/2011 | Danno et al. |
| 2011/0267998 A1 | 11/2011 | Meharry et al. |
| 2011/0316745 A1 | 12/2011 | Yin |
| 2012/0127034 A1 | 5/2012 | DiFonzo |
| 2012/0313219 A1 | 12/2012 | Chen et al. |
| 2013/0050055 A1 * | 2/2013 | Paradiso ............. H01Q 21/0093 343/893 |
| 2013/0057449 A1 | 3/2013 | Orihashi et al. |
| 2013/0072125 A1 | 3/2013 | Yoon et al. |
| 2013/0088381 A1 | 4/2013 | Puzella et al. |
| 2013/0088391 A1 | 4/2013 | Corman et al. |
| 2013/0187830 A1 | 7/2013 | Warnick et al. |
| 2014/0111373 A1 | 4/2014 | Puzella et al. |
| 2014/0210668 A1 | 7/2014 | Wang et al. |
| 2014/0255040 A1 | 9/2014 | Fujita et al. |
| 2014/0266897 A1 | 9/2014 | Jakoby et al. |
| 2014/0266902 A1 | 9/2014 | Kamgaing et al. |
| 2014/0348035 A1 | 11/2014 | Corman et al. |
| 2015/0016561 A1 | 1/2015 | Negus et al. |
| 2015/0116177 A1 | 4/2015 | Powell et al. |
| 2015/0171523 A1 | 6/2015 | Kamgaing et al. |
| 2015/0234035 A1 | 8/2015 | Lohoefener et al. |
| 2015/0241552 A1 * | 8/2015 | Mohamadi ............. A61B 5/0507 342/175 |
| 2015/0263424 A1 | 9/2015 | Sanford et al. |
| 2015/0362583 A1 | 12/2015 | Ainspan et al. |
| 2016/0020844 A1 | 1/2016 | Hart et al. |
| 2016/0056544 A1 | 2/2016 | Garcia et al. |
| 2016/0141757 A1 | 5/2016 | Lai et al. |
| 2016/0218429 A1 | 7/2016 | Klemes |
| 2016/0226142 A1 | 8/2016 | Leroux |
| 2016/0248157 A1 | 8/2016 | Rao et al. |
| 2016/0277078 A1 | 9/2016 | Trotta |
| 2017/0062910 A1 | 3/2017 | Iida |
| 2017/0062926 A1 | 3/2017 | Bonebright et al. |
| 2017/0085006 A1 | 3/2017 | Corman et al. |
| 2017/0194703 A1 | 7/2017 | Watson |
| 2017/0229785 A1 | 8/2017 | Fu et al. |
| 2017/0237180 A1 | 8/2017 | Corman et al. |
| 2017/0302003 A1 | 10/2017 | Elsallal et al. |
| 2017/0353338 A1 | 12/2017 | Amadjikpe et al. |
| 2018/0019804 A1 * | 1/2018 | Buer ..................... H01Q 3/247 |
| 2018/0054005 A1 | 2/2018 | Jain et al. |
| 2018/0069309 A1 | 3/2018 | Friedman et al. |
| 2018/0090814 A1 | 3/2018 | Yoon et al. |
| 2018/0109404 A1 | 4/2018 | Yoon et al. |
| 2018/0115087 A1 | 4/2018 | Besoli et al. |

(56) References Cited

U.S. PATENT DOCUMENTS

| | | |
|---|---|---|
| 2018/0175476 A1* | 6/2018 | Teshiba .................. H01L 25/18 |
| 2018/0183504 A1 | 6/2018 | McMorrow et al. |
| 2018/0219283 A1 | 8/2018 | Wilkins et al. |
| 2018/0234119 A1 | 8/2018 | Gharavi et al. |
| 2018/0287266 A1 | 10/2018 | Madsen et al. |
| 2018/0294826 A1 | 10/2018 | Fouche et al. |
| 2018/0337739 A1 | 11/2018 | Petersson et al. |
| 2019/0173538 A1 | 6/2019 | Wu et al. |
| 2020/0036103 A1 | 1/2020 | Ariumi |
| 2020/0145265 A1 | 5/2020 | Fleizach |

OTHER PUBLICATIONS

European Patent Office—Extended European Search Report,—EP Application No. 16862647.1, dated Aug. 6, 2019, 7 pages.

International Searching Authority—International Search Report—International Application No. PCT/US2016/052215, dated May 29, 2017, together with the Written Opinion of the International Searching Authority, 16 pages.

Ismail, "Introduction to RF CMOS IC Design for Wireless Applications, Analog VLSI Lab," The Ohio State University, 117 pages, Dec. 11, 2001.

Jain, "Layout Review Techniques for Low RF Designs," Application Note AN098, Texas Instruments, 14 Pages, 2012.

Maxim, "5GHz, 4-Channel MIMO Transmitter", MAX2850, Maxim Integrated Products, Inc., 33 pages, 2010.

Silicon Labs, "Layout Design Guide for Si4455/435x RF Ics," AN685, Silicon Laboratories, 22 pages, 2014.

International Search Report and Written Opinion for International Application No. PCT/US2018/067449, dated Apr. 30, 2019 (16 pages).

* cited by examiner

BEAMFORMING INTEGRATED CIRCUIT, AESA SYSTEM AND METHOD

PRIORITY

This patent application claims priority from provisional U.S. patent application No. 62/610,227, filed Dec. 24, 2017, entitled, "BEAMFORMING INTEGRATED CIRCUIT AND AESA," and naming Pavel Brechko, David Corman, Vipul Jain, Shamsun Nahar, Jason Durbin, and Nitin Jain as inventors, the disclosure of which is incorporated herein, in its entirety, by reference.

FIELD OF THE INVENTION

The invention generally relates to active electronically scanned/steered arrays (AESAs) and, more particularly, to beamforming integrated circuits for AESAs.

BACKGROUND

Active electronically steered/scanned antenna systems ("AESA systems," a type of "phased array system") or active antenna systems form electronically steerable beams for a wide variety of radar and communications systems. To that end, AESA systems typically have a plurality of beamforming elements (e.g., antennas) that transmit and/or receive energy so that such energy can be coherently combined (i.e., in-phase and amplitude). This process is referred to in the art as "beamforming" or "beam steering." Specifically, for transmission, many AESA systems implement beam steering by providing various RF phase shift and gain settings. The phase settings and gain weights together constitute a complex beam weight between each beam-forming element. For a signal receiving mode, many AESA systems use a beamforming or summation point.

To achieve beam-forming using an antenna array, each antenna element is connected to a semiconductor integrated circuit generally referred to as a "beam-forming IC." This microchip/integrated circuit may have a number of sub-circuit components implementing various functions. For example, those components may implement phase shifters, amplitude. control modules or a variable gain amplifier (VGA), a power amplifier, a power combiner, a digital control, and other electronic functions. Such an integrated circuit is packaged to permit input and output radio frequency (RF) connections.

SUMMARY OF VARIOUS EMBODIMENTS OF THE INVENTION

In accordance with illustrative embodiments, a method of transmitting a signal using beamforming provides providing a beamforming integrated circuit for use with an AESA. The integrated circuit includes a plurality of RF transmit channels, and each of the RF transmit channel has a first input configured to receive a signal, a phase controller configured to shift the phase of the first signal, an amplifier configured to amplify the signal, and an output configured to forward the signal to a transmit element of the AESA. The integrated circuit also has at least one power input.

The method further receives an energizing signal though the power input, and operates the integrated circuit at a quiescent current with the received energizing signal so that the integrated circuit operates at an RF power value within a prescribed range of RF power values. In preferred embodiments, the RF power value does not exceed about 10 dBm in output P1 dB, and is greater than about −3 dBm.

The RF power value may be between X dBm and Y dBm, where X is between 1-9.7 and Y is between 1-9.8. X preferably is less than Y for the selected values of X and Y. As such, the RF power value may be between one or more of the following ranges:
  4-9 dBm,
  4-8 dBm,
  4-7 dBm,
  4-6 dBm,
  4-5 dBm.

The integrated circuit may have a surface with a plurality of interface ports. This surface has a first edge and a second edge and a first RF interface port adjacent or at the first edge, and a second RF interface port adjacent to or at the second edge. The first and second RF interface ports may be configured to operate on signals having different polarizations. For example, the first RF interface port may be configured to interface with signals that are orthogonal to signals upon which the second RF port interfaces. The integrated circuit may have a quiescent DC power of between about 50 and about 80 milliwatts for each channel.

In accordance with another embodiment, a beamforming integrated circuit for use with an AESA has a plurality of RF transmit channel. Each of the RF transmit channel has a first input configured to receive a signal, a phase controller configured to shift the phase of the first signal, an amplifier configured to amplify the signal, and an output configured to forward the signal to a transmit element of the AESA. The integrated circuit also has at least one power input for receiving an energizing signal that energizes the plurality of RF transmit channels. The integrated circuit is configured to operate at an RF power using the energizing signal. The integrated circuit preferably is configured to operate so that the RF power has a value not exceeding about 10 dBm, and not less than about −3 dBm.

In accordance with other embodiments, a beamforming integrated circuit system configured to receiving and/or transmitting a beam has a plurality of RF ports, and a plurality of RF circuitry channels for transmitting and/or receiving RF signals. Each of the RF circuitry channels is operatively coupled with at least one of the RF ports. The system also has a channel controller operatively coupled with the plurality of RF circuitry channels. The channel controller is configured to selectively turn on and off one or more sub-sets of the plurality of the RF circuitry channels to control the system in a prescribed manner.

The system may include a unitary integrated circuit body containing the plurality of RF circuitry channels, plurality of RF ports, and channel controller. Alternatively, unitary body may not include the channel controller. In that case, the system may include a second integrated circuitry body containing the channel controller. In that latter case, the unitary and second integrated circuit bodies are configured to communicate with each other.

The channel controller may be configured to selectively turn on and off one or more sub-sets of the plurality of the RF circuitry channels to control a variety of different system functions. For example, it may be configured to control the shape or magnitude of a transmitted or received beam, enable distribution or combination of signals from different beamforming integrated circuits in an AESA, and/or control power consumption in a prescribed manner.

The channel controller may control the selective use of the RF circuitry channels before transmitting or receiving, or while transmitting or receiving.

In accordance with another embodiment, a method of controlling a system function energizes a beamforming integrated circuit having a plurality of RF circuitry channels for transmitting and/or receiving RF signals, and determines a desired system function. The method then selectively turns on and off one or more sub-sets of the plurality of the RF circuitry channels to control the desired system function.

A first RF circuitry channel of the plurality of RF circuitry channels may have a first selectable phase shifter configured to shift a first signal, and a second RF circuitry channel of the plurality of RF circuitry channels may have a second selectable phase shifter configured to shift a second signal. The method further may select the phase shift of the first signal by selecting the first phase shifter and the phase shift of the second signal by selecting the selecting phase shifter. Next, a combiner may receive the shifted first and second signals from the first and second channels, and combine the first and second shifted signals to produce a combined signal. The first and second phase controllers thus are selected so that the combined signal has one of a plurality of different selectable polarizations.

In accordance with still other embodiments, a beamforming integrated circuit for use with an AESA has a unitary body with an interface surface and a wafer level chip-scale package. The integrated circuit also has beamforming RF circuitry configured to process signals for transmitting and/or receiving RF signals, and a plurality of RF interfaces operatively coupled with the RF circuitry and on the interface surface. The plurality of RF interfaces are configured for communicating the signals with the plurality of elements of the AESA. Each of the RF interfaces is RF isolated from each other by having at least one adjacent ground interface.

Each RF interface may be adjacent to at least two ground interfaces. In some embodiments, the unitary body comprises an edge, and each RF interface is adjacent to the edge and at least one ground interface. The at least one ground interface also may be adjacent to the edge. Each RF interface has an outside dimension that preferably is adjacent to at least one ground interface and the edge only.

The unitary body may include an edge and each RF interface may be positioned between two ground interfaces. In that case, the two ground interfaces and RF interface can be adjacent to the edge of the unitary body. To optimize the integrated circuit, it may also have a plurality of power interfaces that are radially inward of the RF interfaces having an adjacent ground interface. Moreover, each RF interface and its adjacent ground interface preferably defines a space of between about 300 and 400 microns. The noted RF isolation preferably mitigates noise and cross-talk between RF interface pads at microwave and millimeter-wave frequencies.

In accordance with other embodiments, a beamforming integrated circuit for use with an AESA has a unitary body that includes a wafer level chip-scale package. The integrated circuit also has beamforming RF circuitry within the wafer level chip-scale package configured to process signals for transmitting and/or receiving RF signals, and a plurality of RF interfaces on the wafer level chip-scale package and operatively coupled with the RF circuitry. The plurality of RF interfaces are adjacent to an edge of the body. In addition, a plurality of ground interfaces may be positioned on the wafer level chip-scale package relative to the RF interfaces to isolate the RF interfaces from other RF interfaces.

In accordance with other embodiments, a phased array system has a plurality of beamforming elements, and a plurality of beamforming integrated circuits ("ICs"). A first set of the beamforming ICs are in communication with the beamforming elements, and a second set of the beamforming ICs are "node ICs" configured to combine and/or distribute signals toward/from a plurality of the beamforming ICs in the first set.

While of the plurality of beamforming ICs have a first number of signal interfaces, the node ICs may at least one signal interface that is electrically uncoupled. For example, one or more of the signal interfaces of the node ICs may be coupled with either a) other node ICs, b) first set ICs, or c) Wilkinson, and the total number of other node ICs, first set ICs, and/or Wilkinson coupled with a given node ICs may be less than the total number of signal interfaces.

As like ICs, the first and second sets of beamforming ICs have substantially the same functional elements. For example, the first and second sets of beamforming ICs may have the same number of interfaces, and/or the same types of beamforming ICs with substantially the same electrical characteristics. Moreover, the node ICs are configured to combine signals and not distribute signals, or they may be configured to distribute signals and not combine signals. To improve beam fidelity, at least one of the node ICs may be configured to amplify and/or phase shift signals.

In accordance with another embodiment, a phased array system may have a substrate, a plurality of beamforming elements on the substrate, and a plurality of beamforming integrated circuits ("ICs"). A first set of the beamforming ICs are in communication with the beamforming elements, while a second set of the beamforming ICs are "node ICs." The system also has a first transmission line electrically between a first node IC and a first beamforming IC in the first set, and a second transmission line electrically between the first node IC and a second beamforming IC in the first set. The first node IC is configured to distribute and/or combine signals toward/from the first and second beamforming ICs.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a set of multi-channel (e.g., quad-channel) beam-forming integrated circuits ("ICs") have either transmit or receive functionality and dual polarization outputs. The ICs are configured to be highly flexible while remaining small enough to fit within the lattice for a planar active electronically steered/scanned antenna systems ("AESA systems") intended for satellite communication applications. Among other things, the ICs may have an arrangement of RF outputs with optimized isolation between ports, independent double-polarization channels with independent phase, amplitude and bias controls, and a flip-chip, wafer level chip-scale packaging arrangement.

With this high degree of flexibility, the ICs may be used as 1) a beamforming IC in an AESA system enabling arbitrary polarization (e.g., linear, circular, elliptical), and/or 2) a distribution IC in arrays, simultaneously enabling amplification as well as signal combining/division function. In both cases, the IC can provide phase and amplitude correction in the system, shape an output beam, and/or optimize power dissipation of the array (e.g., selectively disabling channels).

ICs can be lower power than those in the prior art and yield the same or improved beams, while selectively disabling channels to control beam shape and reduce power. Moreover, rather than using a customized integrated circuit, some AESA systems can use beamforming ICs as distribution or transmission nodes for multiple beamforming ICs. Details of illustrative embodiments are discussed below.

Figure 1:
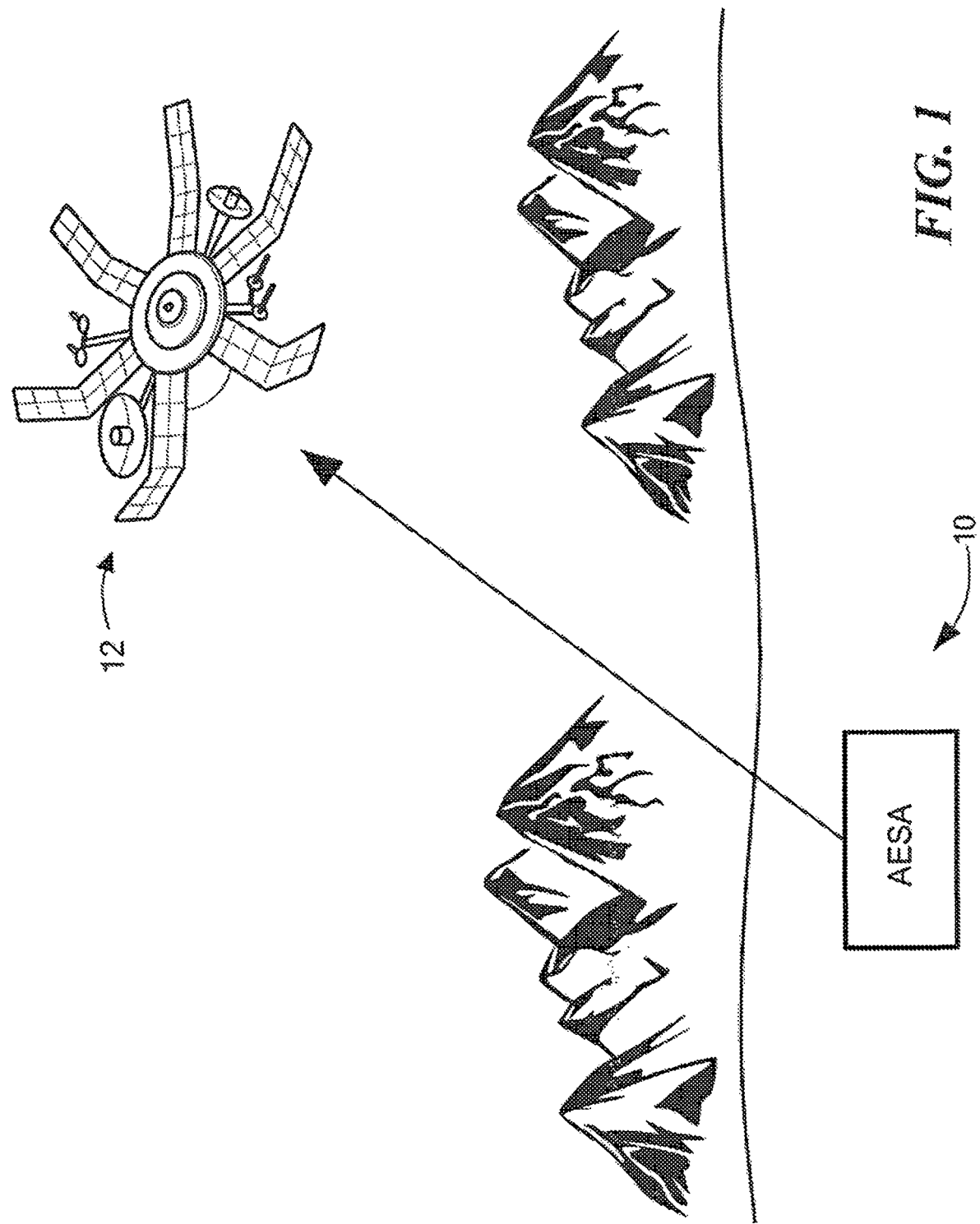
FIG. 1 schematically shows an active electronically steered antenna system ("AESA system") configured in accordance with illustrative embodiments of the invention and communicating with a satellite.

FIG. 1 schematically shows an AESA system 10 configured in accordance with illustrative embodiments of the invention and communicating with an orbiting satellite 12. A phased array (discussed below and identified by reference number "10A" at least in FIG. 3) implements the primary functionality of the AESA system 10. Specifically, as known by those skilled in the art, the phased array 10A forms one or more of a plurality of electronically steerable beams that can be used for a wide variety of applications. As a satellite communication system, for example, the AESA system 10 preferably is configured to operate at one or more satellite frequencies. Among others, those frequencies may include the Ka-band, Ku-band, and/or X-band.

The AESA system 10 may be part of a cellular network operating under a known cellular protocol, such as the 3G, 4G, or 5G protocols. Accordingly, in addition to or instead of communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 (implementing the noted phased array 10A) in a wide variety of other applications, such as broadcasting, optics, radar, etc. Some embodiments may be configured for non-satellite communications and instead communicate with other devices, such as smartphones (e.g., using 4G or 5G protocols). Accordingly, discussion of communication with orbiting satellites 12 is not intended to limit all embodiments of the invention.

Figure 2A:
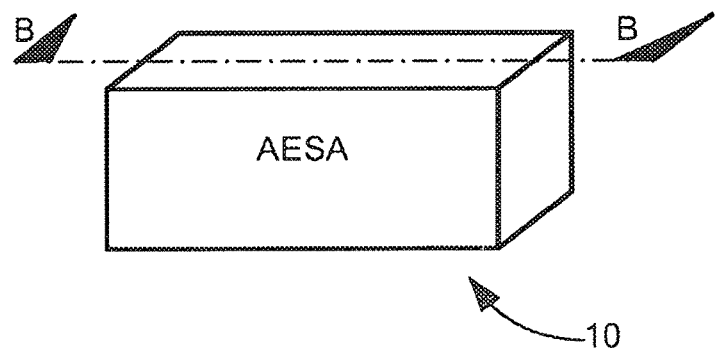
FIGS. 2A and 2B schematically show generalized diagrams of an AESA system that may be configured in accordance with illustrative embodiments of the invention.
Figure 2B:
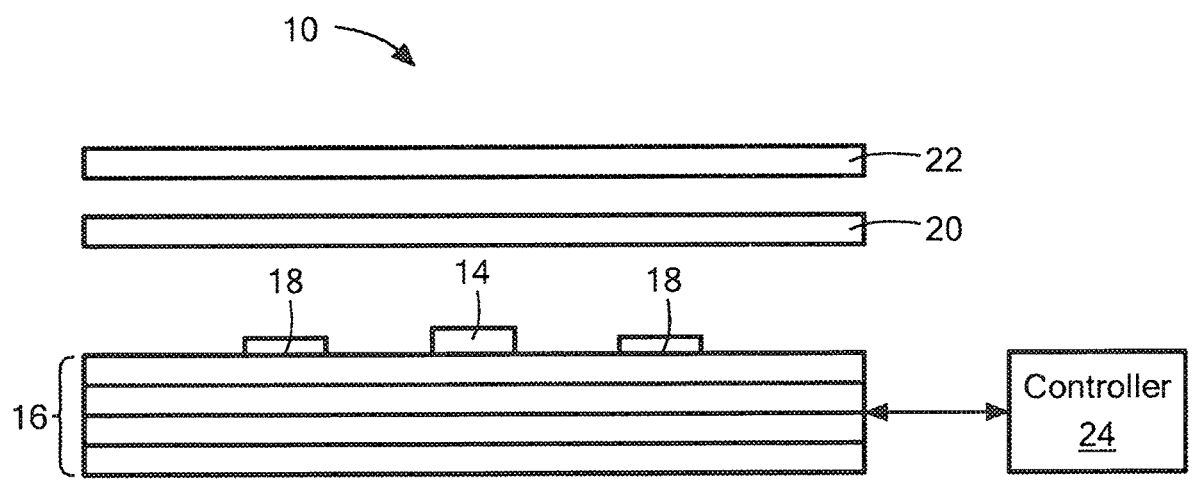

FIGS. 2A and 2B schematically show generalized diagrams of the AESA system 10 configured in accordance with illustrative embodiments of the invention. Specifically, FIG. 2A schematically shows a block diagram of the AESA system 10, while FIG. 2B schematically shows a cross-sectional view of a small portion of the same AESA system 10 across line B-B. This latter view shows a single silicon integrated circuit 14 (elements 18, discussed below) mounted onto a substrate 16 between two transmit and/or receive elements 18, i.e., on the same side of a supporting substrate 16 and juxtaposed with the two elements 18. In alternative embodiments, however, the integrated circuit 14 could be on the other side of the substrate 16. The phased array 10A also has a polarizer 20 to selectively filter signals to and from the phased array 10A, and a radome 22 to environmentally protect the phased array 10A. A separate antenna controller 24 electrically connects with the phased array 10A to calculate beam steering vectors for the overall phased array 10A, and to provide other control functions.

Figure 3A:
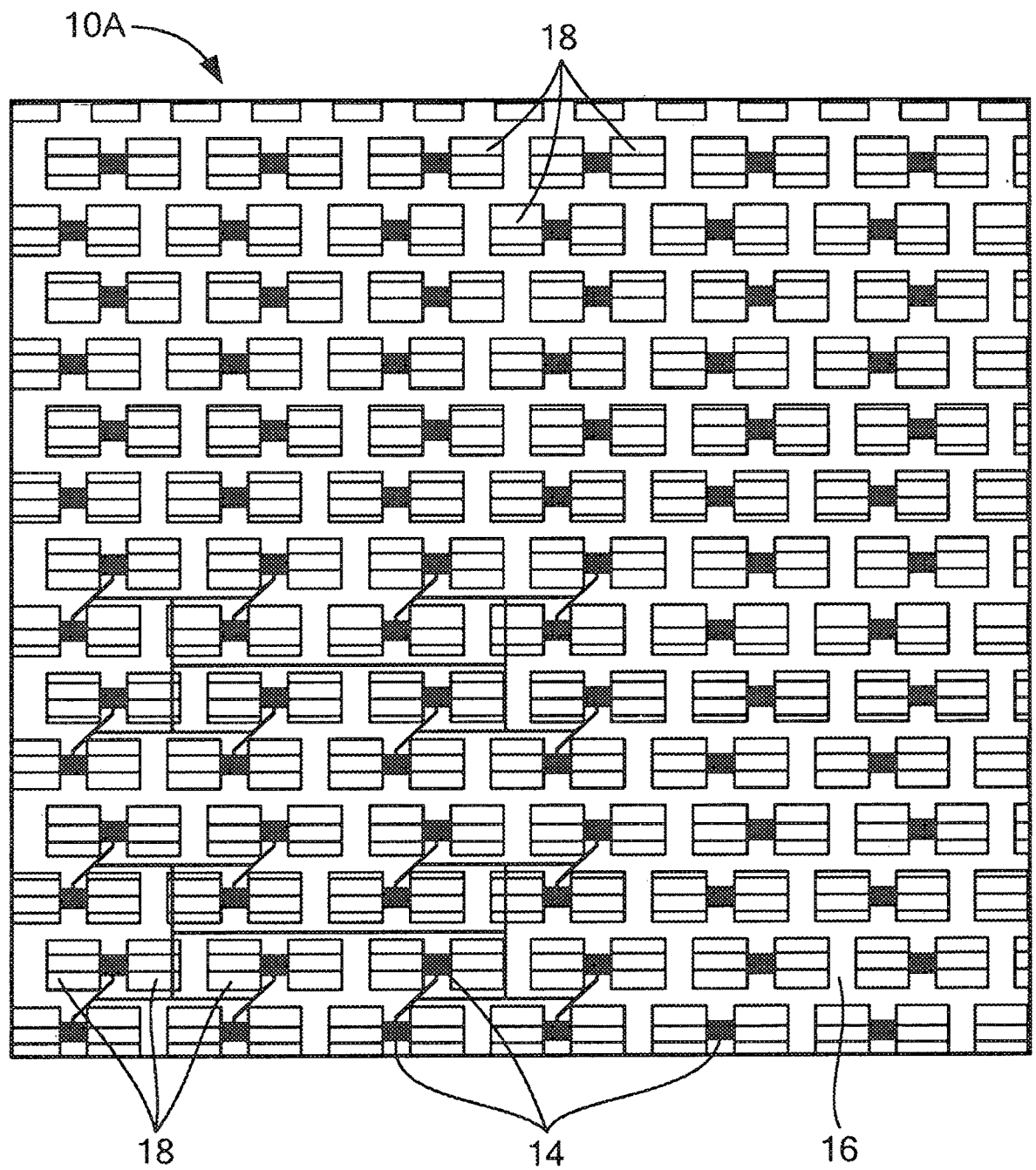
FIG. 3A schematically shows a plan view of a laminar printed circuit board portion of an AESA configured in accordance with illustrative embodiments of the invention.

FIG. 3A schematically shows a plan view of a primary portion of an AESA system 10 that may be configured in accordance with illustrative embodiments of the invention. In a similar manner, FIG. 3B schematically shows a close-up of a portion of the phased array 10A of FIG. 3A.

Specifically, the AESA system 10 of FIG. 3A is implemented as a laminar phased array 10A having a laminated printed circuit board 16 (i.e., acting as the substrate and also identified by reference number "16") supporting the above noted plurality of elements 18 and integrated circuits 14. The elements 18 preferably are formed as a plurality of square or rectangular patch antennas oriented in a triangular patch array configuration. In other words, each element 18 forms a triangle with two other adjacent elements 18. When compared to a rectangular lattice configuration, this triangular lattice configuration requires fewer elements 18 (e.g., about 15 percent fewer in some implementations) for a given grating lobe free scan volume. Other embodiments, however, may use other lattice configurations, such as a pentagonal configuration or a hexagonal configuration. Moreover, despite requiring more elements 18, some embodiments may use a rectangular lattice configuration. Like other similar phased arrays, the printed circuit board 16 also may have a ground plane (not shown) that electrically and magnetically cooperates with the elements 18 to facilitate operation.

Figure 3B:
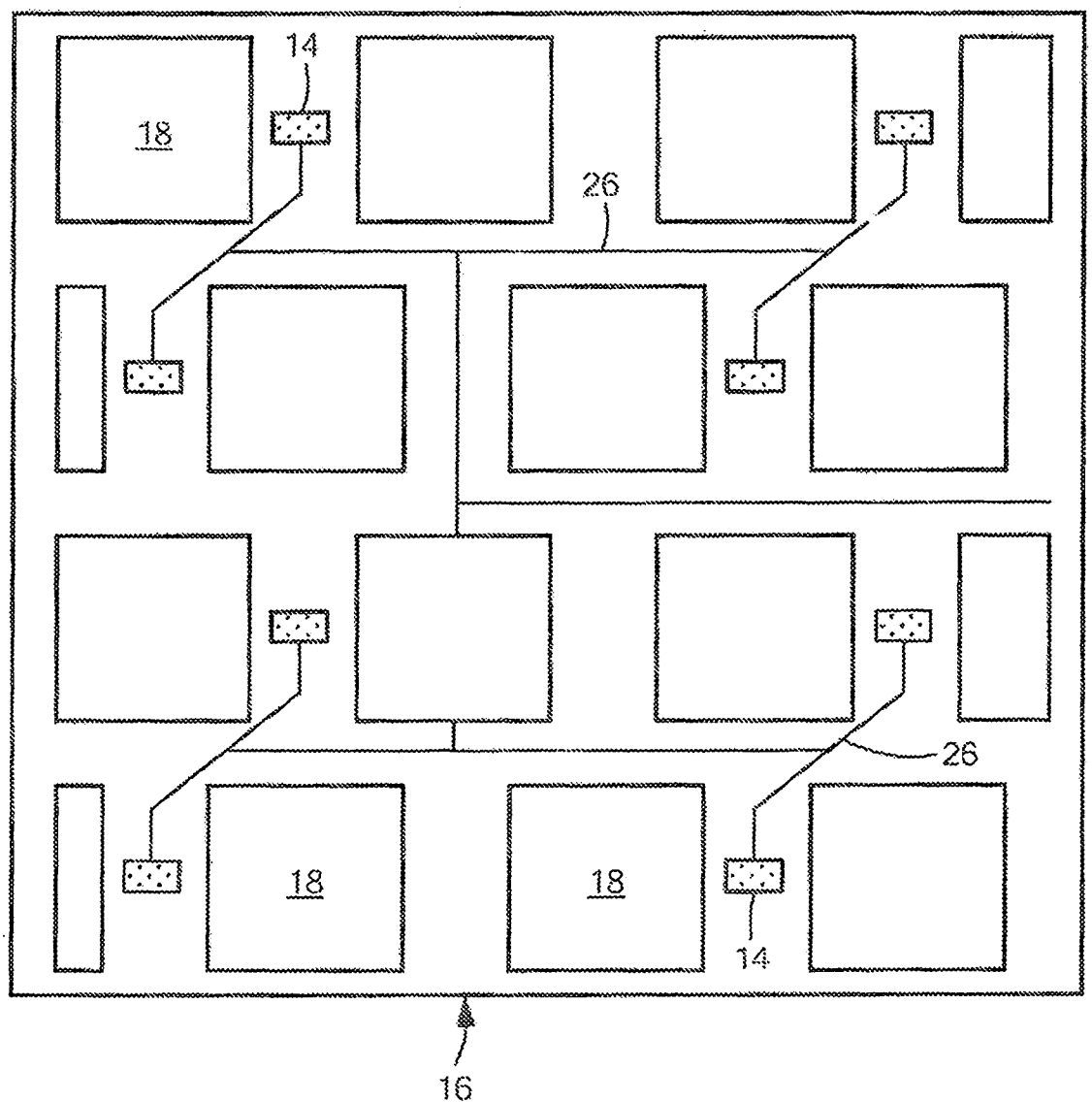
FIG. 3B schematically shows a close-up of a portion of the laminated printed circuit board of FIG. 3A.
Figure 3C:
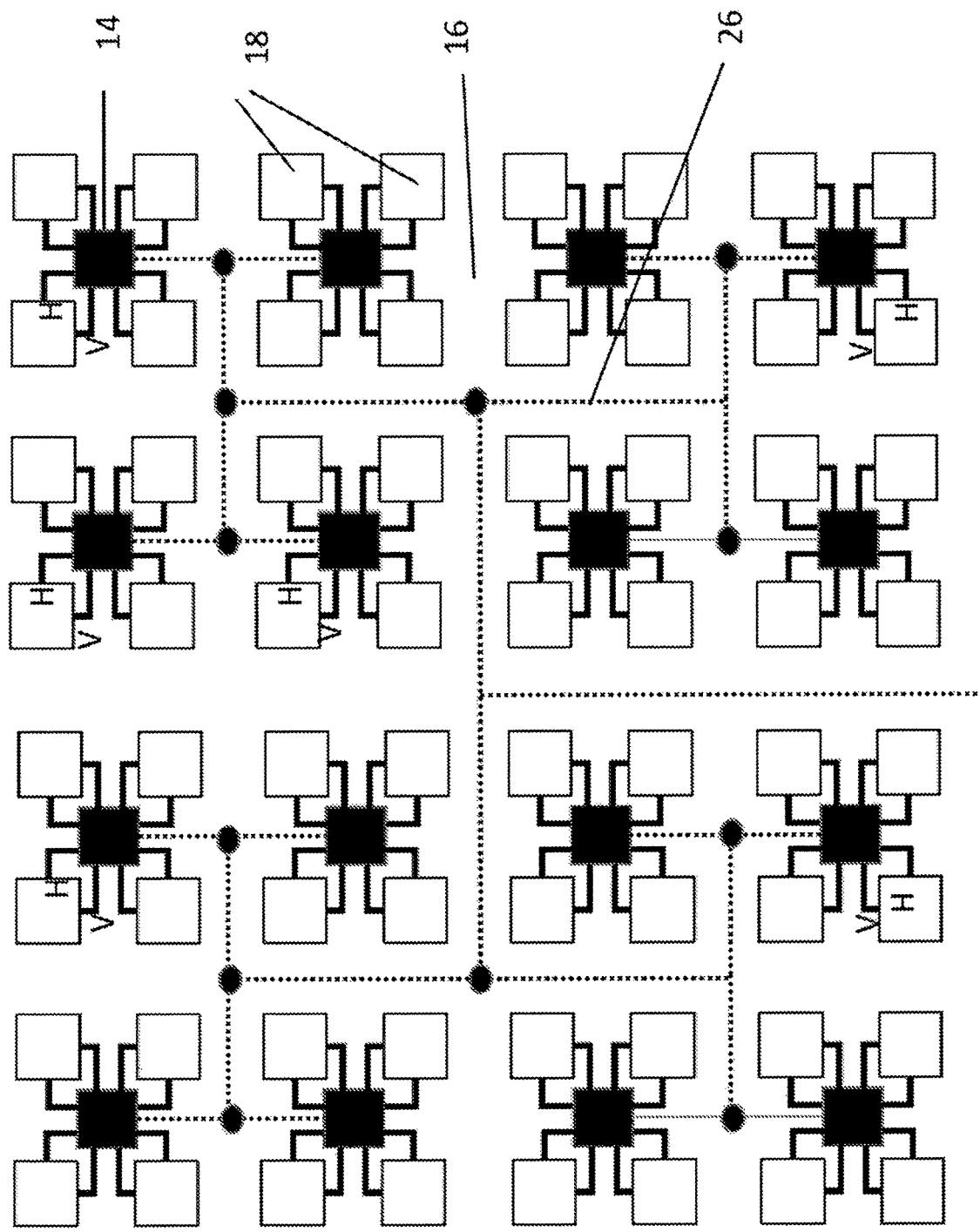
FIG. 3C schematically shows a plan view of a laminar printed circuit board portion of an AESA configured in a rectangular lattice in accordance with illustrative embodiments of the invention.

In contrast to the triangular arrangement of FIG. 3A, FIG. 3C shows a rectangular arrangement of elements 18 where each element is excited at two orthogonal positions for different possible excitations—H and V excitation. The dots on line 26 represent Wilkinson's or a power divider.

Indeed, the array shown in FIGS. 3A and 3B is a small phased array 10A. Those skilled in the art can apply principles of illustrative embodiments to laminar phased arrays 10A with hundreds, or even thousands of elements 18 and integrated circuits 14. In a similar manner, those skilled in the art can apply various embodiments to smaller phased arrays 10A.

As a patch array, the elements 18 have a low profile. Specifically, as known by those skilled in the art, a patch antenna (i.e., the element 18) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field. Illustrative embodiments may form the patch antennas using conventional printed circuit board fabrication processes, such as by depositing one or more successive metal layers on the printed circuit board 16. Accordingly, using such fabrication processes, each radiating element 18 in the phased array 10A should have a very low profile.

The AESA system 10 can have one or more of any of a variety of different functional types of elements 18. For example, the AESA system 10 can have transmit-only elements 18, receive-only elements 18, and/or dual mode receive and transmit elements 18 (referred to as "dual-mode elements 18"). Each element 18 also may have dual polarization, whether in receive mode, transmit mode, or both. For significant flexibility, illustrative embodiments may have dual-mode dual polarization, which is transit and receive; and in addition having horizontal and vertical polarization as shown in FIG. 3C. The transmit-only elements 18 are configured to transmit outgoing signals (e.g., burst signals) only, while the receive-only elements 18 are configured to receive incoming signals only. In contrast, the dual-mode elements 18 are configured to either transmit outgoing burst signals, or receive incoming signals, depending on the mode of the phased array 10A at the time of the operation. Specifically, when using dual-mode elements 18, the phased array 10A can be in either a transmit mode, or a receive mode. In each of the transmit or received mode, the element 18 and IC 14 can also support dual polarization. The noted controller 24 at least in part controls the mode and operation of the phased array 10A, as well as other array functions. Tx and Rx chips are kept separate to maximize performance by eliminating loss of unnecessary Tx/Rx switches and also to account for the fact that often antenna arrays for Tx and Rx have different sizes due to different transmit and receive frequencies.

The AESA system 10 has a plurality of the above noted integrated circuits 14 (noted with regard to FIG. 2B) for controlling operation of the elements 18. Those skilled in the art often refer to these integrated circuits 14 as "beam steering integrated circuits" or "beamforming integrated circuits" ("BFICs").

To minimize its footprint, each integrated circuit 14 preferably is configured with at least the minimum number of functions to accomplish the desired effect. Indeed, integrated circuits 14 for dual mode elements 18 are expected to have some different functionality than that of the integrated circuits 14 for the transmit-only elements 18 or receive-only elements 18. Accordingly, integrated circuits 14 for such non-dual-mode elements 18 may have a smaller footprint than the integrated circuits 14 that control the dual-mode elements 18. Despite that, some or all types of integrated circuits 14 fabricated for the phased array 10A can be modified to have a smaller footprint. In some embodiments, separate transmit-only and receive only integrated circuits 14 may enhance performance by eliminating loss of unnecessary transmit/receive switches, and also to account for the fact that often AESAs for transmit purposes and receive purposes often have different sizes.

As an example, depending on its role in the phased array 10A, each integrated circuit 14 may include some or all of the following functions:
 phase shifting,
 amplitude controlling/beam weighting,
 switching between transmit mode and receive mode,
 output amplification to amplify output signals to the elements 18,
 input amplification for received RF signals (e.g., signals received from the satellite 12), and
 power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier, the phase shifting may use conventional active or passive phase shifters, and the switching functionality may be implemented using conventional transistor-based switches. These and additional details of the structure and functionality of integrated circuits 14 are discussed below with reference to FIGS. 5 and 6.

As noted above, the AESA system 10 preferably communicates with one or more orbiting satellites 12 and thus, uses satellite frequencies for that communication. Accordingly, the plurality of integrated circuits 14 preferably are configured operate the phased array 10A at one or more frequencies of the Ka-band, Ku-band, and/or X-band to communicate with at least one satellite 12. Of course, as satellite communication technology progresses, future implementations may modify the frequency bands of the integrated circuits 14 to communicate using new satellite frequencies.

Multiple elements 18 preferably share the integrated circuits 14, thus reducing the required total number of integrated circuits 14. This reduced number of integrated circuits 14 correspondingly reduces the required size of the printed circuit board 16, which reduces the cost of the AESA system 10. In addition, more surface area on the top face of the printed circuit board 16 may be dedicated to the elements 18.

To that end, each integrated circuit 14 preferably operates on at least one element 18 in the array. For example, one integrated circuit 14 can operate on two or four different elements 18. Of course, those skilled in the art can adjust the number of elements 18 sharing an integrated circuit 14 based upon the application. For example, a single integrated circuit 14 can control two elements 18, three elements 18, five elements 18, six elements 18, seven elements 18, eight elements 18, etc., or some range of elements 18. Sharing the integrated circuits 14 between multiple elements 18 in this manner reduces the required total number of integrated circuits 14, correspondingly reducing the required size of the printed circuit board 16.

As noted above, the dual-mode elements 18 may operate in a transmit mode, or a receive mode. To that end, the integrated circuits 14 may generate time division diplex or duplex waveforms so that a single aperture or phased array 10A can be used for both transmitting and receiving. In a similar manner, some embodiments may eliminate a commonly included transmit/receive switch in the side arms (discussed below with regard to FIG. 5) of the integrated circuit 14. Instead, such embodiments may duplex at the element 18. This process can be performed by isolating one of the elements 18 between transmit and receive by an orthogonal feed connection.

RF interconnect and/or beamforming lines 26 electrically connect the integrated circuits 14 to their respective elements 18. To further minimize the feed loss, illustrative embodiments mount the integrated circuits 14 as close to their respective elements 18 as possible. Specifically, this close proximity preferably reduces RF interconnect line lengths, reducing the feed loss. To that end, each integrated circuit 14 preferably is packaged either in a flip-chipped configuration using wafer level chip scale packaging (WLCSP), or a traditional package, such as quad flat no-leads package (QFN package). While other types of flip-chip packaging may suffice, WLCSP techniques are preferred to minimize real estate on the substrate 16.

In addition to reducing feed loss, using WLCSP techniques reduces the overall footprint of the integrated circuits 14, enabling them to be mounted on the top face (or the reverse face) of the printed circuit board 16 with the elements 18—providing more surface area for the elements 18.

It should be reiterated that although FIGS. 3A and 3B (and other figures) show the AESA system 10 with some specificity (e.g., the layout of the elements 18 and integrated circuits 14), those skilled in the art may apply illustrative embodiments to other implementations. For example, as noted above, each integrated circuit 14 can connect to more or fewer elements 18, or the lattice configuration can be different. Accordingly, discussion of the specific configuration of the AESA system 10 of FIG. 3A (and other figures) is for convenience only and not intended to limit all embodiments.

Figure 4:
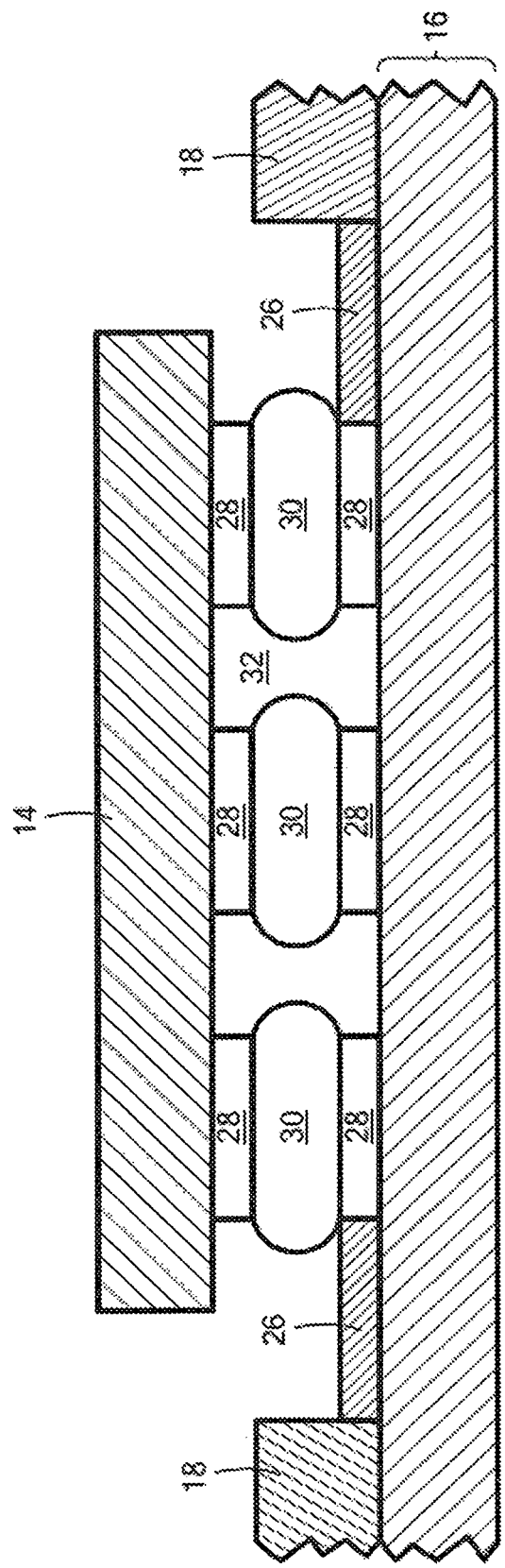
FIG. 4 schematically shows a cross-sectional view of the laminated printed circuit board of 3A to highlight the mounting of its integrated circuits.

FIG. 4 schematically shows a cross-sectional view of the layout of components on the laminated printed circuit board 16 of 3A to highlight the flip-chip mounting of its integrated circuits 14. The integrated circuit 14 in this drawing intentionally is enlarged to show details of a flip-chip mounting technique. Unlike techniques that permit input/output ("I/O") only on the edge of the integrated circuit 14, flip-chip mounting permits I/O on interior portions of the integrated circuit 14.

As shown, the integrated circuit 14 has a plurality of pads 28 aligned with a plurality of corresponding pads 28 on the printed circuit board 16. These opposing pads 28 on the integrated circuit 14 and the printed circuit board 16 may be considered to form pairs of pads 28. Solder 30 (e.g., solder balls) electrically connects each the pads in corresponding pairs of pads 28. Interconnect lines, traces, and other electrical interconnects on/in the printed circuit board 16 (e.g., lines 26) thus permit the integrated circuit 14 to communicate with other elements 18 through this electrical interface.

The embodiment shown in FIG. 4 forms a space or void (identified by reference number "32") between the bottom of the integrated circuit 14 (from the perspective of this drawing) and the top surface of the printed circuit board 16. This space 32 may remain an open void—containing no material. Some embodiments may take advantage of this extra space 32 to add further components, such as additional circuit elements, without requiring more circuit board space. Alternatively, this space 32 may contain fill material (not shown) for further mechanical stability and thermal management of the integrated circuit 14.

Other embodiments, however, still may use similar integrated circuits 14, but not use flip-chip mounting techniques. Instead, other mounting techniques may couple the integrated circuits 14 with the substrate 16. Among other things, those techniques may incorporate surface mounting, or wirebond mounting with the integrated circuit 14 rotated 180 degrees from the orientation of FIG. 4. Accordingly, discussion of flip-chip mounting techniques is but one of a variety of different techniques that may be used with various embodiments of the invention.

Figure 5:
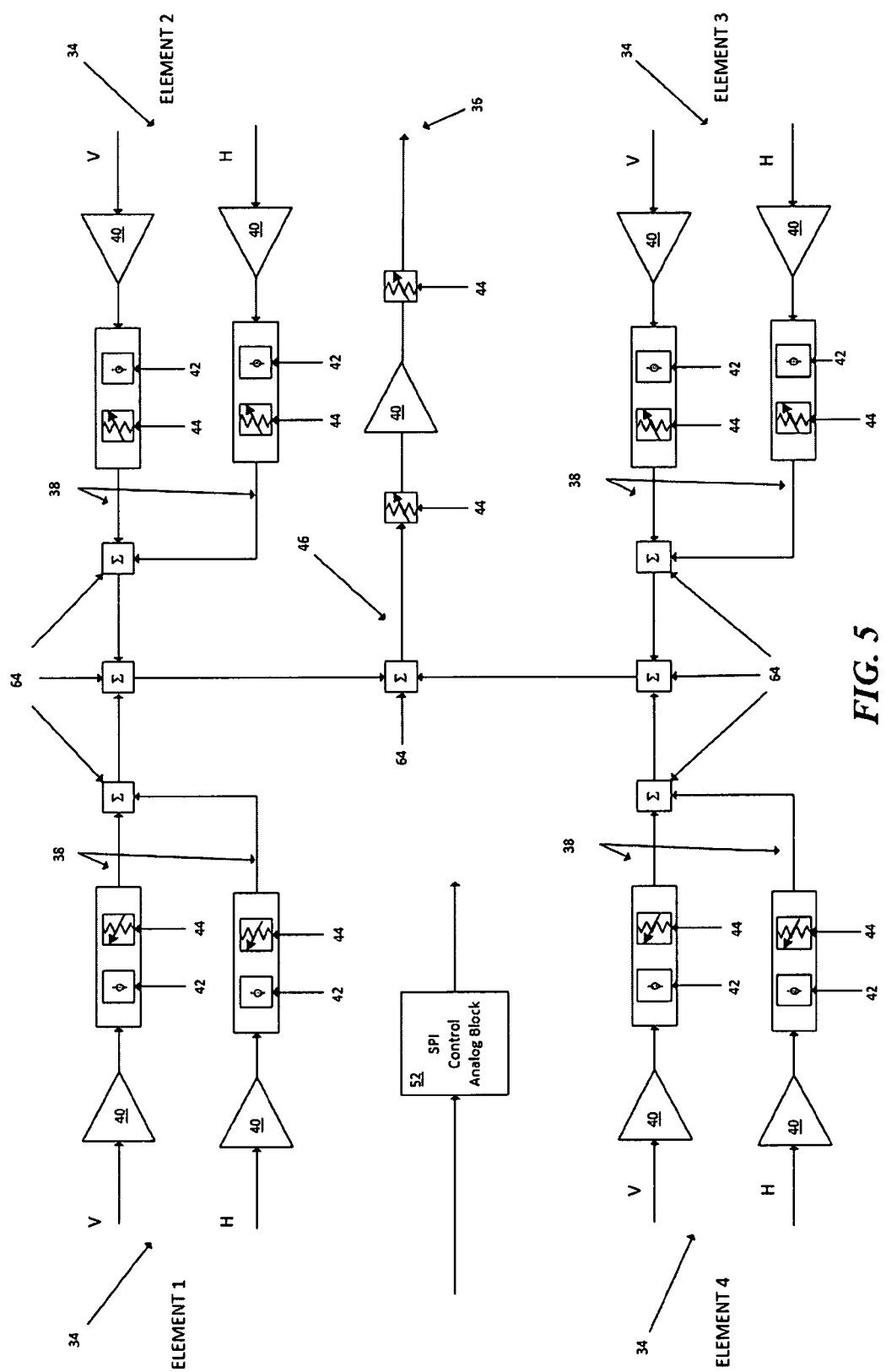
FIG. 5 schematically shows details of a receive beamforming integrated circuit in accordance with illustrative embodiments of the invention.

FIG. 5 schematically shows details of a receive beamforming IC 14 in accordance with illustrative embodiments of the invention. As shown, the receive IC 14 has four channels 34 that each receives a signal from a satellite 12 via one of Elements 1-4. Those channels 34 combine their signals to produce a single output signal at a common receive output/interface 36. To that end, each channel 34 has a vertical polarization ("V-pole") receive branch 38 and a horizontal polarization ("H-pole") receive branch 38. Both of these branches 38 in a single channel 34 preferably is logically spaced about 90 degrees apart from one another. For example, one of the branches 38 may connect with the vertical edge of a given rectangular element 18, while the other branch 38 may connect with the horizontal edge of the same element 18 as shown in FIG. 3C.

Both the vertical and horizontal branches 38 of a single channel 34 preferably have the same circuit elements in their respective pipelines. Specifically, each branch 38 has a low noise amplifier 40 to amplify the incoming signal, the phase shifter 42 to shift the signal, and a pair of attenuators 44 for selectively attenuating the signal. The attenuator 44 adjusts to appropriately attenuate the signal as desired for a given application and is used primarily for beamforming purposes. In addition, the attenuator 44 also may be partly used for process and temperature corrections. Among other things, the beamforming IC 14 also may include other functional blocks, such as those for array tapering for sidelobe control, beam broadening for covering more area include for search and seek of target communication device on the other side, temperature compensation, polarization control, etc.

The two branches 38 of each channel 34 preferably are combined at a combining node 64, and then again combined with the signal(s) of another adjacent channel combining node 64. All of the channels 34 in the example combine at a central combining node 64 and direct their signals through an output path 46 to the receive common output interface/pad 36. This output path 46 optionally has additional attenuators 44, and an amplifier 40 to produce a single combined signal from all of the channels 34, as well as an assortment of other amplifiers 40 (all amplifiers generically identified by reference number "40" for simplicity) used for optimizing noise figure and power dissipation of the IC 14. The circuitry in these channels 34 and the output path 46 may be referred to as "RF circuitry." The left middle of the drawing also shows digital circuitry 52 for controlling the operation of the various components within the IC 14. For example, the digital circuitry 52 may include an input to receive an input voltage (e.g., 1.2, 1.5, or 1.8 volts), logic and control memories to store and manage data, temperature sensors, and the noted serial/parallel port interface ("SPI"). Those skilled in the art can have other digital control circuitry and thus, discussion of specific digital control circuitry is for exemplary purposes only.

Figure 6:
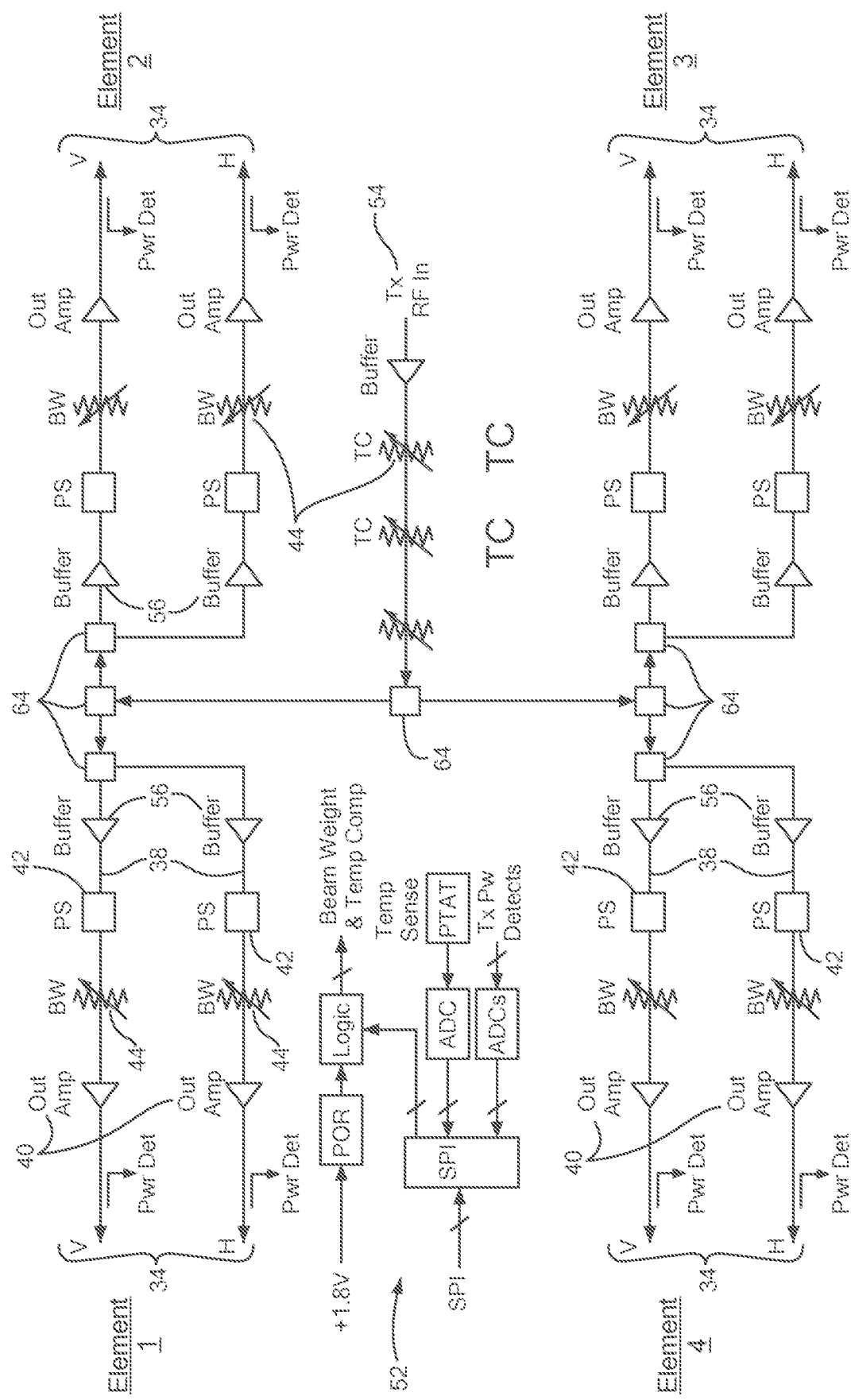
FIG. 6 schematically shows details of a transmit beamforming integrated circuit in accordance with illustrative embodiments of the invention.

FIG. 6 schematically shows details of a transmit beamforming IC 14 in accordance with illustrative embodiments of the invention. The layout of this integrated circuit 14 is similar to that of the receive beamforming IC 14, except it is directed to signals (transmit signals) forwarded in the opposite direction. Accordingly, the transmit IC 14 has a common input 54 (a common interface 54) for receiving a signal to be transmitted, and the series of distribution nodes 64 that distribute the signal between the four different channels 34 and, ultimately, the two branches 38 of each of the four channels 34.

In a manner similar to the receive IC 14, each branch 38 of the channel 34 has amplification (e.g., the "buffer 56") phase shifters 42, and attenuators 44. In illustrative embodiments, this transmit IC 14 also has monitoring circuitry (not shown) in each channel 34 or branch 38. Specifically, this monitoring circuitry ensures that a given element 18 is operational and meeting minimum power thresholds during operation. Alternative embodiments also have similar monitoring circuitry on the receive beamforming ICs 14.

It should be noted that the specific values in the figures are illustrative of certain examples and not requirements of various embodiments. Those skilled in the art can select the precise values based upon their intended applications.

Prior art beamforming ICs known to the inventors typically operate at relatively higher RF power values, such as 14 dBm (absolute power level measured in decibels and referenced to 1 milliwatt). Those skilled in the art seem to prefer operating at such higher values because it obviates the need for a high number of elements 18 for beam transmission. Instead, fewer elements 18 are required to produce what is believed to be a comparably functional beam. As such, the size of the AESA system 10 beneficially can be reduced.

Despite this teaching, the inventors recognized that operating the beamforming IC 14 at higher power values for satellite transmission purposes had a negative effect—it can cause the resulting transmitted beam to interfere with the neighboring satellite 12. Accordingly, contrary to the conventional wisdom, the inventors recognized that, despite typically requiring more transmission elements 18, operating the beamforming IC 14 at a lower power produced a better, more controllable signal.

Illustrative embodiments therefore operate at lower RF power values than those in the prior art (e.g., below 14 dBm). In particular, the inventors recognized that the transmit IC 14 may operate at values at or below 10 dBm. For example, the output RF power may have a P1 dB value (the measurement of output power which refers to 1 dB compression from expected linear value) of between 6 dBm and 9.9 dBm—at or under 10 dBm also is sufficient. As noted, this lower power value enables a high number of elements 18 to meet critical system requirement, such as efficiency, radiation pattern, array size, and emitted radiated power.

For example, the RF power may have a value between X dBm and Y dBm, where X is between 0-9.7 and Y is between 0.1-9.8, and X<Y for the selected values of X and Y. Some examples of such values may be within these one or more of the below ranges: 4-9 dBm, 4-8 dBm, 4-7 dBm, 4-6 dBm, 4-5 dBm. 4-10 dBm and −3 to 4 dBm also are additional ranges that should provide sufficient results in certain instances.

Rather than simply running at lower power (e.g., by reducing the input RF power level to a location 54 of FIG. 6), the same beamforming ICs that are made to operate at high RF power values (e.g., P1 dB of 14 dBm and above), some embodiments configure the beamforming IC 14 to operate at such lower RF power values by reducing the maximum available RF power from the IC. This illustrative configuration saves energy by reducing the DC power requirements of the beamforming IC 14 and the requirements that otherwise may be necessary and/or useful in a high RF power beamforming IC 14. For example, among other things, the beamforming IC 14 preferably is configured to operate at a quiescent current that, when receiving an energizing signal via a power input port, maintains the operating power within the desired range (e.g., 10 dBm or below). In addition, those skilled in the art preferably configure the load impedance, buffers 56, amplifiers 40, phase shifters 42, and other circuit elements to operate using this lower RF power operation.

Figure 7:
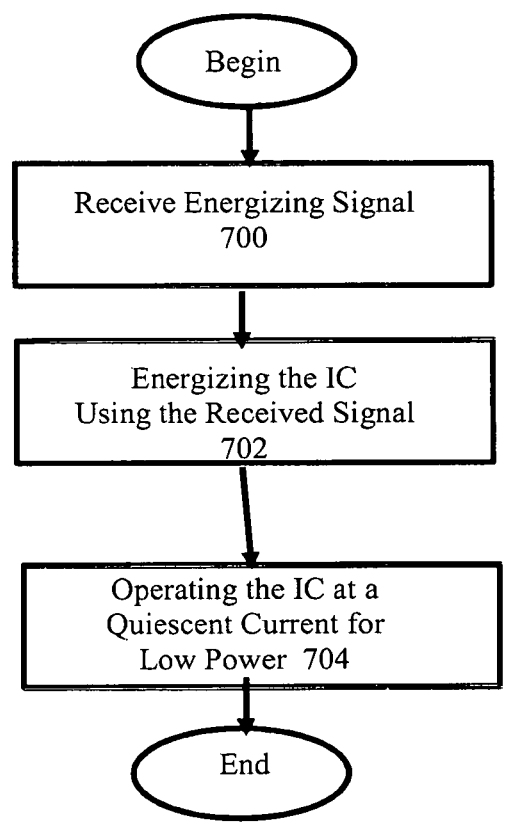
FIG. 7 shows a process of using lower power in accordance with illustrative embodiments of the invention.

FIG. 7 shows a process of operating the beamforming IC 14 in a lower RF power mode as discussed above. The process begins at 700, which receives an energizing DC signal though its power input pad 28. This port may be similar to that shown in FIG. 10 (discussed below) as an analog supply port. As noted herein, some embodiments may have different supply ports to receive energizing signals of different magnitudes. Receipt of this energizing signal energizes the IC 14 (step 702), causing the IC 14 to operate at a quiescent current that ensures the configured lower power (step 704). For example, the quiescent current may be configured to be between about 41 and 67 milliamps per channel (e.g., 50 milliamps) from a 1.2V supply upon receipt of a lower value energizing current and/or voltage signal. This example thus yields a total quiescent DC power of about 50 to 80 milliwatts per channel. These values are expected to improve with future efficiency improvements. Accordingly, those in the art may see quiescent currents ranging from lower values, such as 30 or 35 milliamps to 70 milliamps per channel.

The inventors also recognized that they could optimize power consumption, in certain circumstances, by selectively enabling/disabling certain channels 34 of one or more beamforming ICs 14 in the AESA system 10. For example, less power may be sufficient, and even preferred from a performance standpoint, when the AESA system 10 is relatively close to a specific target. Alternatively, more power may be desired to reach a more remote target. The inventors recognized that the ability to optimize the beamforming IC 14 performance based upon that or a number of other selected system characteristics may be desirable—effectuating certain functions. To that end, as schematically shown in the beamforming systems of FIGS. 8A and 8B, the beamforming IC 14 may have a channel controller 62, operatively coupled with the plurality of transmit channels 34, to selectively disable and/or enable one or more channels 34 of the integrated circuit 14 before and/or during transmission or receipt of a beam.

In a similar manner, the inventors recognized that selectively energizing certain channels 34 and thus, their functional elements 18, provides flexibility in controlling the shape, magnitude, polarization, or phase of a transmitted or received beam—another system function. For example, illustrative embodiments may have a channel controller 62 that can energize a first subset of elements 18 if a first beam shape is needed, and a second subset of elements 18 if a different beam shape is needed. In fact, many different subsets/combinations of elements 18 may be configured for many different beam shapes and polarization control. This information may be stored in memory, such as in a look up table (LUT), which the controller accesses to shape a beam.

Those skilled in the art may control the system, whether it is the AESA system 10, the beamforming integrated circuit 14, or both, to control a wide variety of other functions. For example, the channel controller 62 may generate commands to selectively turn on and off one or more subsets of the channels 34 to enable the beamforming integrated circuit 14 to distribute and/or combine signals from different beamforming integrated circuits 14 in an AESA system 10 (discussed herein). As another example, each of the channels 34 of a single eight-channel beamforming integrated circuit 14 may be powered down independently if only one polarization is needed (e.g., if four channels 34 couple with vertical pads 28 and four channels 34 couple with horizontal pads 28). In that case, for example, four out of the eight channels 34 and their elements 18 may be powered down to mitigate unnecessary power dissipation.

Figure 8A:
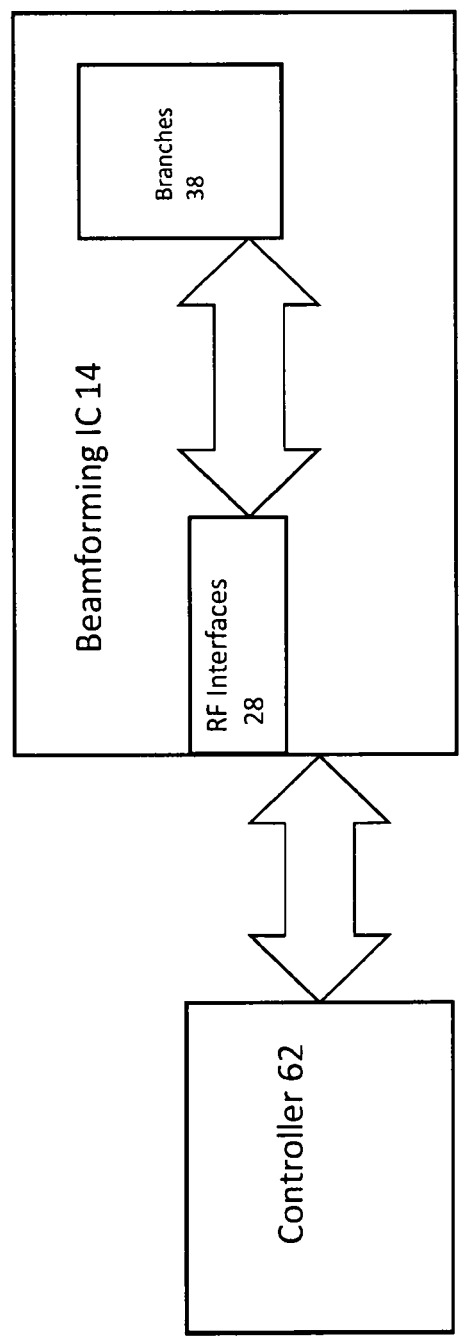
FIGS. 8A and 8B respectively show a controller separate from and integrated into a beamforming integrated circuit in accordance with illustrative embodiments of the invention.
Figure 8B:
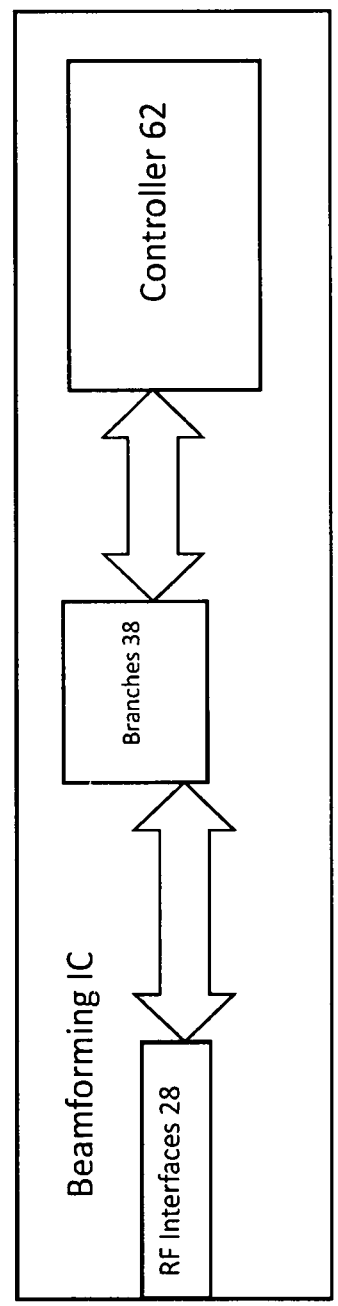

As shown in FIG. 8B, the controller may be integrated into one or more of the plurality of beamforming integrated circuits 14—i.e., within the unitary body of one or more beamforming integrated circuits 14. Alternatively, as shown in FIG. 8A, the channel controller 62 may be a component or integrated circuitry that is separate from the beamforming integrated circuit 14. In that case, the channel controller 62 may be in its own stand-alone integrated circuit. As another example, the channel controller 62 can be distributed across a number of different devices, including on some beamforming integrated circuits 14, on other integrated circuits (e.g., on an application specific integrated circuit) and/or a microprocessor executing code.

Alternative embodiments may enable portions (e.g., certain branches 38) of the channels 34. Consider, for example, FIGS. 5 and 6, in which a beamforming integrated circuit 14 has channels 34 that each have multiple branches 38 with different polarizations. In that case, the channel controller 62 may selectively enable branches 38 of all channels 34 having a certain polarization (e.g., all horizontally polarized branches 38 or all vertically polarized branches 38), or certain branches 38 for some other purpose.

Figure 9:
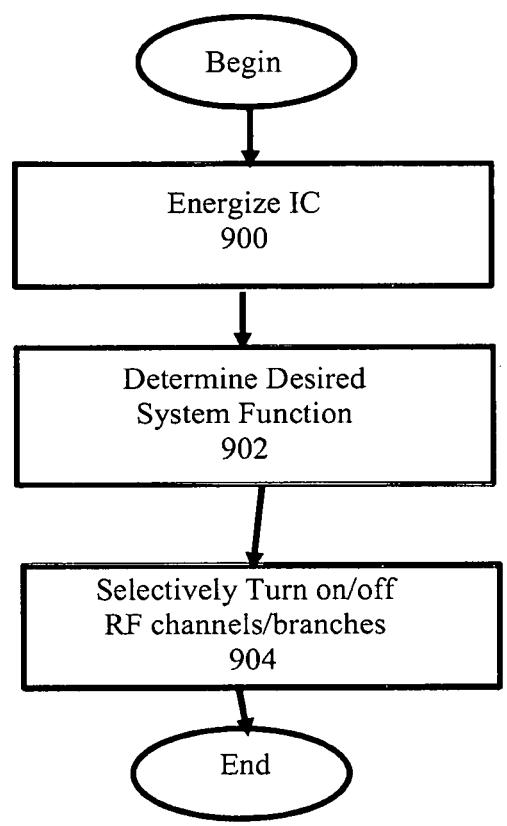
FIG. 9 shows a process selectively disabling channels in accordance with illustrative embodiments of the invention.

FIG. 9 shows a process for controlling the system function using this selective channel energization technique. The process begins at step 900, which energizes the beamforming integrated circuit 14 in a conventional manner (e.g., applying turn-on power). Then, at step 902, the controller determines the desired system function, such as controlling the shape of the beam, polarization, polarization purity, side-lobes, or any of the noted desired system functions discussed above (among other things). Next, during transmission or receipt, or before transmission or receipt, Step 904 selectively turns on/off sets of channels 34 and/or branches 38.

Figure 10:
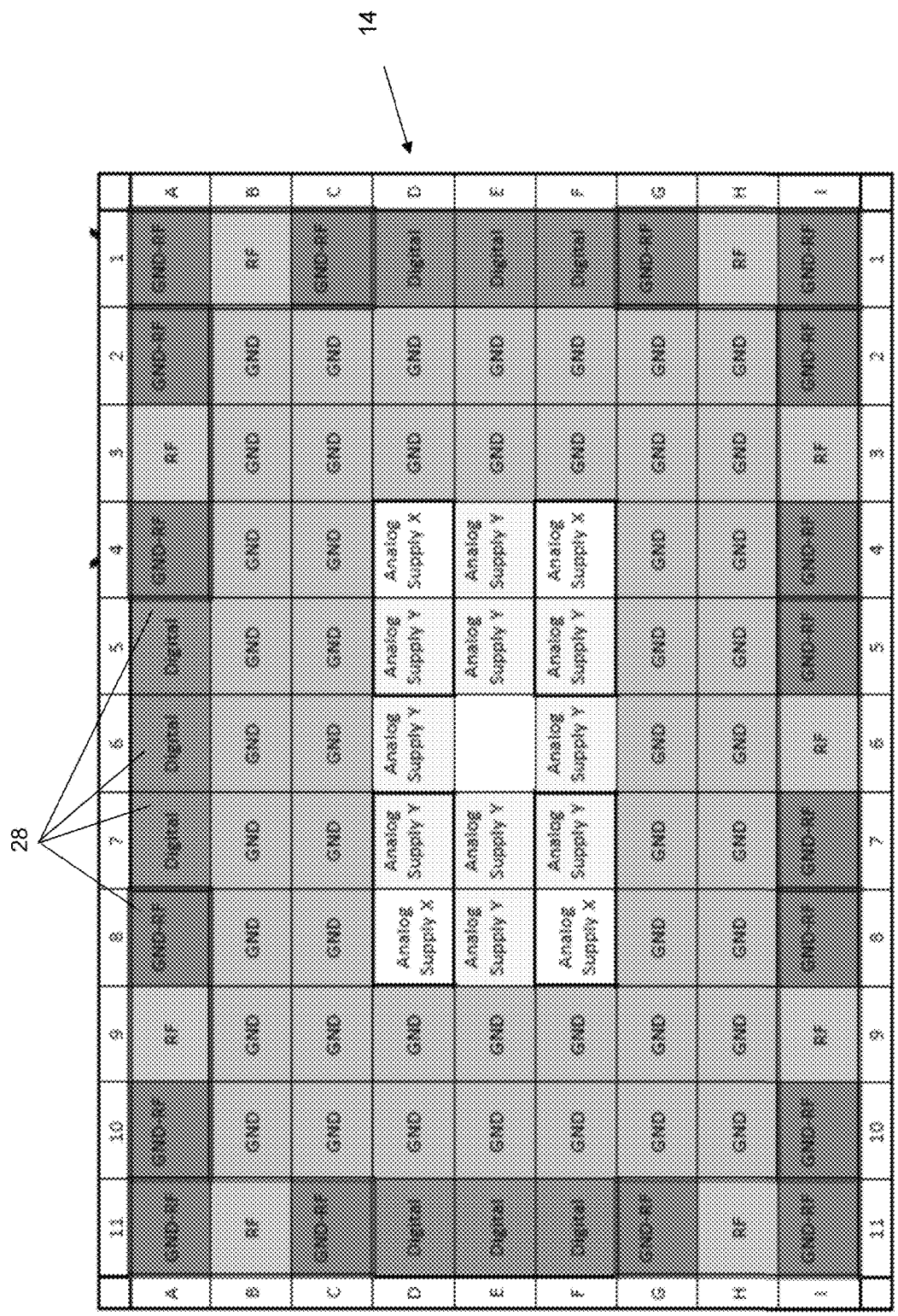
FIG. 10 schematically shows a plan view of interfaces of a beamforming integrated circuit in accordance with illustrative embodiments of the invention.

FIG. 10 schematically shows a plan view of interfaces 28 on an interface surface of a beamforming IC 14 in accordance with illustrative embodiments of the invention. In preferred embodiments, the interfaces are implemented as a plurality of pads 28 on the bottom side of a flip-chip beamforming IC 14. Each of the pads 28 are clearly marked schematically as squares and as having one of a plurality of specific functions. Those functions are identified as follows:

Analog Supply X: input supply voltage having a value of X volts
Analog Supply Y: input supply voltage having a value of Y volts, where Y volts is different from X volts
GND: a standard ground
GND-RF: ground for the RF pads
RF: RF input (for receive beamforming ICs 14)/RF output (for transmit beamforming ICs 14)
Digital: digital interfaces for controlling the beamforming IC 14.

As noted and shown, this design permits two different types of analog supply interfaces for receiving two different supply voltages in a single beamforming IC 14. Specifically, one set of the supply interfaces (e.g., Analog Supply X) can receive a powering signal having a first voltage, while a second set of supply interfaces (e.g., Analog Supply Y) can receive a powering signal having a second (different or same) voltage. The inventors recognized that this design can improve the flexibility of the beamforming IC 14. Specifically, this design enables optimization of the supply voltage for sensitive blocks with the extra supply voltage interfaces (e.g., the Analog Supply X interfaces at the corners of the array of power interfaces). This design also may optimize power dissipation of the low noise amplifier 40 in the receive beamforming IC 14, or the power amplifier 40 in the transmit beamforming IC 14. While the two different analog supply are shown, in certain application they can be connected and thus, a single supply can be used.

In illustrative embodiments of the invention, the analog supply pads 28 are concentrated in an inner region of the IC surface (i.e., the surface to be flip-chip mounted on the substrate 16). FIG. 10, for example, shows an incomplete 5×3 array/set of fourteen analog supply pads 28 in that inner region. Of note is the absence of the center pad 28, which may be omitted or added in other embodiments. This high-current DC injection area in the center of the chip may minimize the complexity of final application board design. Indeed, various embodiments may have more or fewer than fourteen analog supply pads 28. Accordingly, like other features shown in this figure, specific locations and numbers of certain elements 18 are illustrative and not intended to limit all embodiments.

A plurality of other interface pads 28 circumscribe this inner set of supply pads 28. These other interface pads 28 may be any of the other pad types listed above. In illustrative embodiments, the analog supply pads 28 are adjacent only to GND pads 28. Specifically, no other pads 28 are between two adjacent pads 28. It should be pointed out that, as shown in the figures, circumscribing does not imply that there is a continuous barrier of interface pads 28 around the inner set of pads 28.

Certain design constraints of AESA systems 10 have a spacing requirement between pads 28. For example, for certain AESA applications, wafer level chip-scale packages are required to space their pads 28 about 400 microns apart. This relatively large pad distance is difficult to attain, however, with such small package designs.

To obviate this problem, illustrative embodiments position some or all of the RF pads 28 are along the edge of the IC 14 and preferably have GND-RF pads 28 adjacent to two of its opposing sides. As shown, those two GND-RF pads 28 also preferably are positioned along the edge. To comply with current design requirements, the RF pads 28 may be spaced about 400 microns from their adjacent GND-RF pads 28. Some embodiments, however, may space the pads 28 between 300-400 microns apart as tighter technology rules perhaps become feasible. The inventors recognized that using a configuration such as this further mitigates noise and cross-talk between RF interfaces/pads 28 at high frequencies, such as in the microwave and millimeter-wave frequencies generally greater than about 10 GHz. This design provides effective RF isolation with its nine RF interface pads 28—e.g., eight for the V and H branches 38 of the four channels 34, and one common RF interface as shown in FIGS. 5 and 6.

After various failed attempts, the inventors recognized that moving the power pads 28 radially inwardly, as shown in FIG. 10, facilitated their ability to meet the spacing requirements and provide the necessary isolation. As shown, some embodiments position a GND pad 28 adjacent to the other, more interior side of the RF pad 28. Also as shown, the digital pads 28 too are adjacent to the edge of the IC 14 for easier access and to mitigate signal loss.

Figure 11:
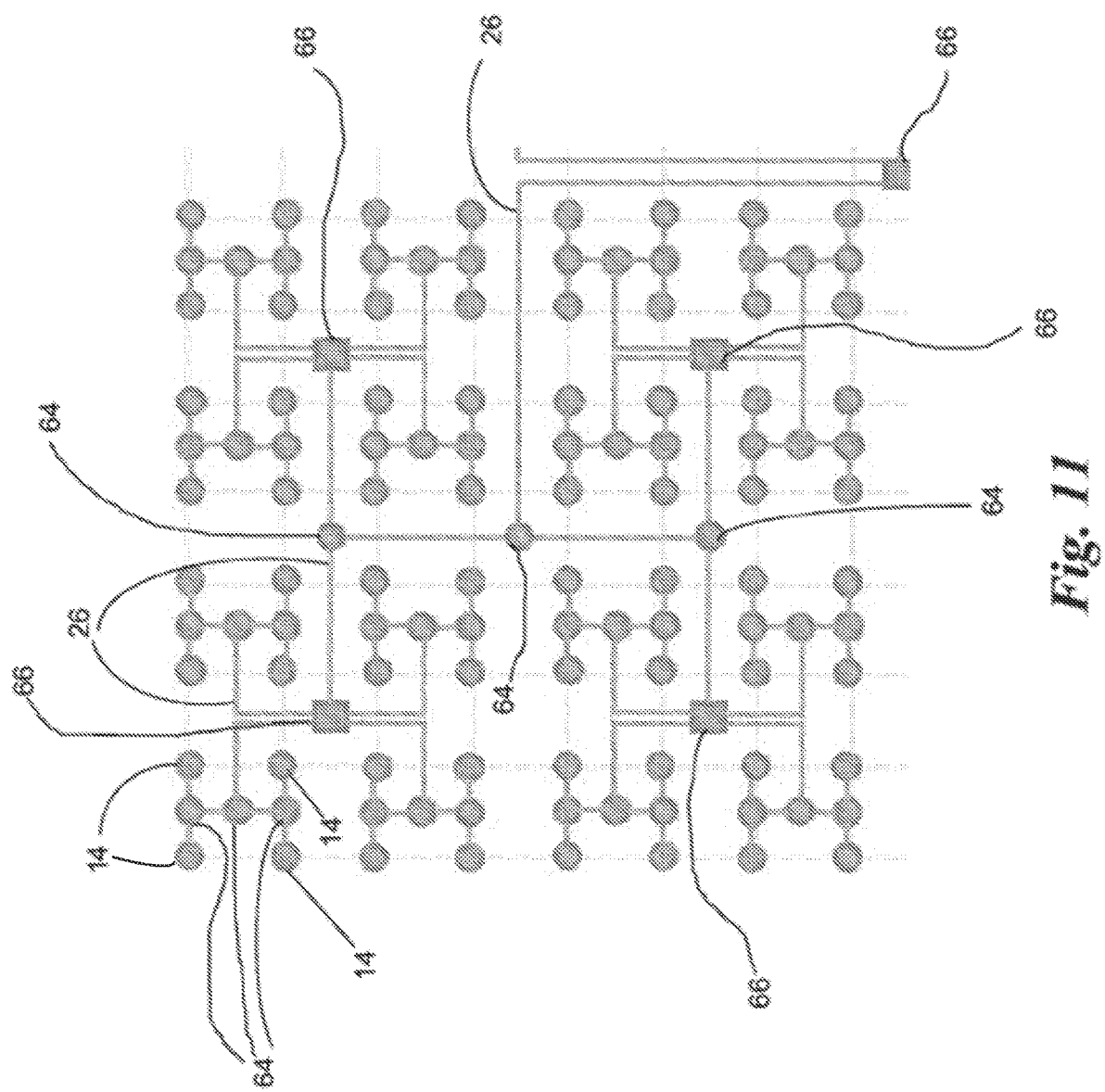
FIG. 11 schematically shows a layout of beamforming integrated circuits across an AESA substrate in accordance with illustrative embodiments of the invention.

FIG. 11 schematically shows a layout of beamforming integrated circuits 14 across an AESA substrate 16 in accordance with illustrative embodiments of the invention. For simplicity, this figure shows just a portion of the layout of a complete AESA system 10. This figure schematically shows a plurality of beamforming ICs 14, divider/combiner nodes, and the electrical connection network for transmitting or receiving signals. This figure of the AESA system 10 may be considered to show a 4×4 array of IC sets. For discussion purposes, the top left set of ICs 14 has a box around it. In this embodiment, the four circles at the corners of the square are beamforming ICs 14 that each are connected to four elements 18 (not shown in this figure) by beamforming lines 26. The three circles of the middle, labelled with reference number "64," thus act as dividers/combiners depending on whether the IC 14 is a transmit or receive IC 14. Such divider/combiners are also referred to as "Wilkinsons."

Node elements 64 and 66 (discussed in detail below) electrically couple signals of the various beamforming IC sets. Prior art AESA systems known to the inventors typically used different integrated circuits that are customized for this function, but different from the beamforming ICs 14. Although those skilled in the art have found that such a scheme may work satisfactorily, the inventors recognized that the different design considerations of such a customized IC can differ from those required to produce or receive a well-defined beam. After experimentation, the inventors discovered that using node devices 64 that are substantially identical to the beamforming ICs 14 in the sets provided more well-defined beams.

Accordingly, in illustrative embodiments of the invention, this AESA system 10 uses other beamforming ICs 14 to act as nodes ("driver ICs 64", "node ICs 66", or "distribution ICs 66"—each of which are beamforming ICs 14) that distribute or combine the signals from the various sets of beamforming ICs 14. Transmission lines 26 electrically couple each set with a node IC 66 (i.e., a like beamforming IC) that combines (if a receive AESA system 10) or distributes (if a transmit AESA system 10) signals from/to the sets of beamforming ICs 14. Specifically, as shown in FIG. 11, the node ICs 64 are electrically coupled between the noted beamforming IC sets. For example, transmission lines 26 (e.g., traces, wires, etc.) of some kind may electrically couple a node IC 66 between 1) other node ICs 64, a beamforming IC 14 in a set, or Wilkinson and 2) other node ICs 64, a beamforming IC 14 in a set, or Wilkinson. As shown in FIG. 11, a single node IC 66 can electrically couple multiple sets of beamforming ICs 14 in a hierarchical manner to scale the array to a large size.

Thus, for the left top box in FIG. 11, the beamforming ICs 14 in the receive mode combines signals using a combining node 64, such as a Wilkinson, and they again combine by another layer of Wilkinson. At that point, the node IC 66 further combines the other beamforming ICs 14 that come together. The node IC 66 position is carefully chosen to maintain a high fidelity of signal in terms of noise and interference. The same process happens in the transmit mode, but in reverse. Those skilled in the art may use the node ICs 66 as a trade-off of noise, gain, and linearity. With this design, each node IC 66 may have substantially the identical functionality to those of the other beamforming ICs 14 in the sets—in this example, the same as the four beamforming ICs 14 in each set.

For example, among other things, the node ICs 64 and other beamforming ICs 14 may:
be formed using the same processes,
in the same fabrication batch,
be the same model/part number,
be a different version of the same model/part number,
be produced with substantially the same specifications and/or performance requirements,
have the same number and types of interfaces,
have interfaces at the same locations, and/or
have substantially the same functional elements/blocks.

Accordingly, the node ICs 64 have beamforming components, such as phase shifters 42, amplifiers 40, that are in the other beamforming ICs 14 of the AESA system 10. The node ICs 64 of this embodiment thus should have the same circuit characteristics as those of the other beamforming ICs 14. In other words, the node ICs 64 in this embodiment may be interchangeable with the other beamforming ICs 14. As with the multi-channel, multi-branch embodiments discussed herein, the node ICs 64 correspondingly preferably have multiple channels 34 that each have multiple branches 38 if used in an AESA system 10 with these beamforming ICs 14. Some embodiments further condition the signals they receive, such as by amplifying, attenuating, buffering, and/or phase shifting before forwarding them to the next component in the AESA system 10.

When implemented as a multi-channel beamforming IC 14, some embodiments of the node IC 66 may enable fewer than all channels 34 when acting as node ICs 64 and thus, not use all signal pads/interfaces 28. This is similar to the embodiment in which fewer than all channels 34 and/or branches 38 are used. The interfaces 28 of these unused or disabled channels 34 accordingly may be considered to be "electrically uncoupled," saving power. Indeed, although some quiescent or other current may be transmitted through such channels 34, they still are considered to be electrically uncoupled because they are not used for beamforming or signal distribution/combination. The quiescent current also may be switched off for uncoupled paths, thus saving power. FIG. 11, for example, shows node ICs 64 that electrically couple with four sets of beamforming nodes. Thus, such node ICs 64 may use only four interfaces/pads 28 and not use the other interfaces/pads 28.

Within the sets of beamforming ICs 14, rather than using Wilkinsons, alternative embodiments use like-type beamforming ICs 14 to distribute/combine signals. Accordingly, as suggested above, in addition to the node ICs 64 discussed above, the nodes receiving or distributing signals within the beamforming IC sets also may include node ICs 64.

In some embodiments, although substantially the same devices, different node ICs 64 in a single AESA system 10 may be configured to apply its functional components in different manners. For example, a node IC 66 receiving signals from four sets of beamforming ICs 14 may amplify signals a first amount, while a node IC 66 receiving signals from sixteen sets of combined beamforming ICs 14 may amplify signals by a second amount, or not at all.

Rather than using only the node ICs 64, this network also may use other conventional dividers/combiners at other locations. Some embodiments, however, may use the node ICs 64 at those locations. Those skilled in the art can select the appropriate number and configurations of the node ICs 64 versus Wilkinsons.

Figure 12:
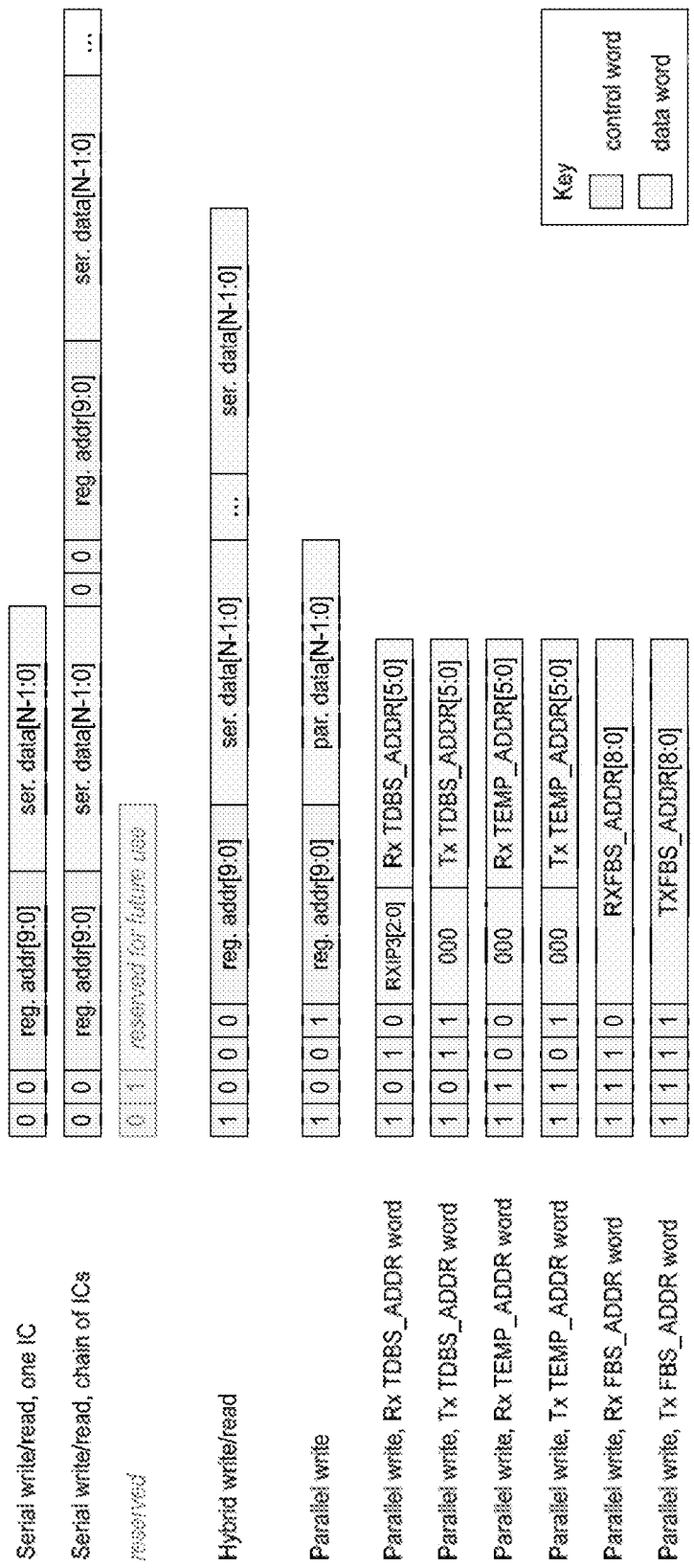
FIG. 12 shows an example of digital transactions in accordance with illustrative embodiments of the invention.

FIG. 12 shows an example of digital transactions that may be used in accordance with illustrative embodiments of the invention. Specifically, in illustrative embodiments, the digital control circuitry (noted above) controls the operation of the beamforming IC 14. Among other things, illustrative embodiments may have a five wire serial interface supporting daisy chain and parallel data write programmable registers. Those registers may hold control and compensation values for the analog/RF circuits on the beamforming IC 14. Other embodiments may have more wires (e.g., 6, 7, 8, or 9 wires) or fewer wires (e.g., 4, 3, or 2) at the serial interface The beamforming IC 14 may have fast memory capability. To that end, in illustrative embodiments, the IC 14 may have fast beam steering attributes because there is no need for transmit/receive switching functionality. Instead, there are eight channels 34 instead of four, and FBS memory may be combined into 512 states. Each state can be 48 bits wide (i.e., 6 bit phase information for 8 channels 34). The IC 14 also may have 3D beam steering capability. For example, it may have 8×(4-bit amp per quad)+3-bit amp in common+8 element-disable bits=43-bits per state. It further may use 32 sets of 48 bits. As noted above, illustrative embodiments also may compensate for performance at different temperatures.

The beamforming IS also may have:
one-time programmable (OTP) non-volatile memory for calibration values,
daisy chain read and write support, and/or
asynchronous latching of power-detector data to minimize RF interference in transmit mode.

With regard to FIG. 12, illustrative embodiments support one or more of series, parallel, hybrid transactions. The leading control words may determine the type of transaction. Specifically:

Serial: The data shifts through the IC's shift registers serially using serial parallel interface ("SPI") as input or output (SPI/SDI or SPI/_SDO).

Hybrid: All selected ICs 14 receive the control word in parallel, and data shifts serially. They may use SPI_PDI for the control word and SPI_SDI for the data.

Parallel: All selected ICs 14 receive data simultaneously on SPI_PDI.

Fast: Short, parallel writes targeting specific registers using SPI_PDI.

Illustrative embodiments of the beamforming ICs 14 produce and track any of a variety of polarization schemes, such as circular polarization, elliptical polarization, or linear polarization. For example, satellites 12 typically use circular polarization for general insensitivity to relative motion. Such a scheme can be produced on either/both the receive or transmit ICs 14.

Figure 13:
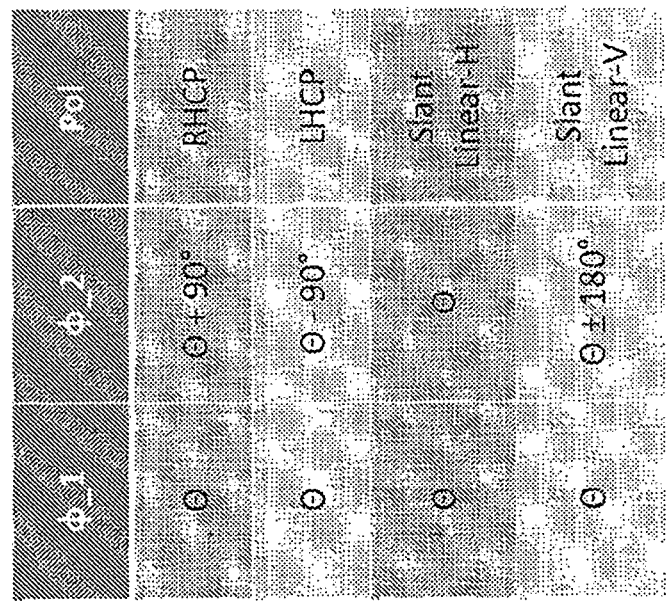
FIG. 13 schematically demonstrates a single channel and a simplified version of its two branches connected with a single element.
Figure 13:
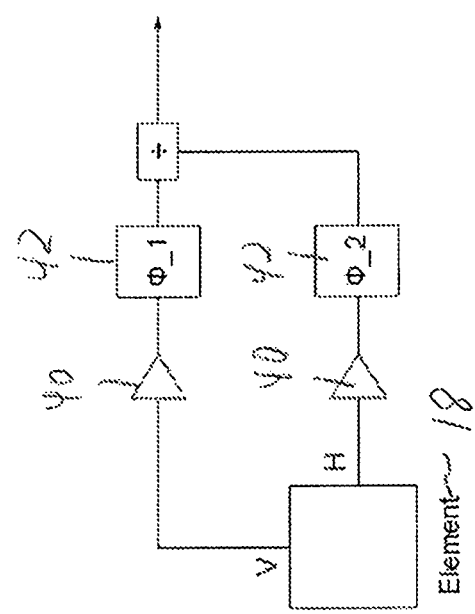

FIG. 13 schematically demonstrates such a scheme, configured in accordance with one embodiment, with a single channel 34 and a simplified version of its two branches 38 connected with a single element 18. As shown, the beamforming IC 14 has a combiner (shown with the division symbol) to receive the shifted first and second signals, from two different branches 38, to produce a combined signal. The branches 38 respectively have first and second amplifiers 40, and first and second phase shifters 42 with related phase shifts. The phase shifters 42 are generically denoted as $\Phi\_1$ and $\Phi\_2$.

The first and second phase shifters 42 are selectable so that the combined signal has one of a plurality of different selectable polarizations. Specifically, the table to the right of the circuit shows how each phase shifter 42 sets its phase to produce different polarizations. Both use a base phase of $\Theta$. Thus, to obtain right hand elliptic polarization, for example, $\Phi\_1$ is set to $\Theta$ and $\Phi\_2$ is set to $\Theta+90$ degrees. The other three listed options are self-explanatory to obtain left hand elliptic polarization, slant linear-H, and slant linear-V. Indeed, those skilled in the art can modify the circuit and parameters to obtain other arbitrary polarizations required for a given application. Accordingly, discussion of the various examples of FIG. 13 is not intended to limit other embodiments.

Although the above discussion discloses various exemplary embodiments of the invention, it should be apparent that those skilled in the art can make various modifications that will achieve some of the advantages of the invention without departing from the true scope of the invention.

What is claimed is:

1. A beamforming integrated circuit for use with an AESA system, the integrated circuit comprising:
a unitary body having an interface surface, the body comprising a flip-chip package;
beamforming RF circuitry configured to process signals for transmitting and/or receiving RF signals; and
a plurality of RF interfaces operatively coupled with the beamforming RF circuitry and on the interface surface, the plurality of RF interfaces configured for communicating the signals to and/or from the beamforming RF circuitry,
each of the RF interfaces on the interface surface being at or adjacent to an outer perimeter of the unitary body and positioned between two dedicated ground-RF (GND-RF) interfaces on the interface surface at or adjacent to said outer perimeter, wherein adjacent RF interfaces on the interface surface along said outer perimeter are separated and RF isolated from each other by at least two GND-RF interfaces along the outer perimeter and wherein at least two RF interfaces are configured to operate on signals having different polarizations.

2. The integrated circuit as defined by claim 1, wherein the outer perimeter is rectangular.

3. The integrated circuit as defined by claim 2, wherein the outer perimeter includes a first edge and a second edge, wherein the plurality of RF interfaces include a first RF interface positioned on the first edge and a second RF interface positioned on the second edge, the first and second RF interfaces being configured to operate on signals having different polarizations.

4. The integrated circuit as defined by claim 3, wherein the first edge and the second edge meet at a corner of the rectangle such that the first and second RF interfaces are adjacent RF interfaces along the outer perimeter and around the corner from one another.

5. The integrated circuit as defined by claim 4, wherein one of the GND-RF interfaces associated with the first RF interface is positioned at the corner such that said GND-RF interface is along both the first edge and the second edge.

6. The integrated circuit as defined by claim 1, further comprising a plurality of power interfaces on the interface surface that are radially inward of the RF interfaces.

7. The integrated circuit as defined by claim 1, wherein the RF interfaces are spaced between 300 and 400 microns apart on the interface surface.

8. The integrated circuit as defined by claim 1, wherein the RF isolation mitigates noise and cross-talk between RF interface pads at microwave and millimeter-wave frequencies.

9. The integrated circuit as defined by claim 1, further comprising:
a plurality of RF transmit channels,
each of the RF transmit channels having a first input configured to receive a signal, a phase controller configured to shift the phase of the first signal, an amplifier configured to amplify the signal, and an output configured to forward the signal to a transmit element of the AESA system; and at least one power input for receiving an energizing signal that energizes the plurality of RF transmit channels, the integrated circuit being configured to operate at an RF power using the energizing signal, the integrated circuit being configured to operate so that the output RF power in P1 dB has a value not exceeding about 10 dBm, the integrated circuit being configured to operate so that the RF power value is not less than about −3 dBm.

10. The integrated circuit as defined by claim 9, wherein the RF power value is between X dBm and Y dBm, where X is between 1-9.7 and Y is between 1-9.8, and X<Y for the selected values of X and Y.

11. The integrated circuit as defined by claim 10, wherein the RF power value is between one or more of the following ranges:
4-9 dBm,
4-8 dBm,
4-7 dBm,
4-6 dBm,
4-5 dBm.

12. The integrated circuit as defined by claim 9, wherein the plurality of RF transmit channels operate with a quiescent current configured to be at a current value to produce the RF power value of between about −3 dBm to about 10 dBm.

13. The integrated circuit as defined by claim 9, wherein the quiescent DC power is between about 50 and about 80 mW for each channel.

14. The integrated circuit as defined by claim 9, wherein the perimeter includes a first edge and a second edge, the integrated circuit further having a first RF interface port adjacent to or at the first edge and a second RF interface port adjacent to or at the second edge, the first and second RF interface ports being configured to operate on signals having different polarizations.

15. The integrated circuit as defined by claim 14, wherein the first RF interface port is configured to interface with signals that are orthogonal to signals upon which the second RF port interfaces.

16. The integrated circuit as defined by claim 1, further comprising:
a plurality of RF circuitry channels for transmitting and/or receiving RF signals, each of the RF circuitry channels being operatively coupled with at least one of the RF interfaces; and
a channel controller operatively coupled with the plurality of RF circuitry channels, the channel controller being configured to selectively turn on and off one or more sub-sets of the plurality of the RF circuitry channels to control the system in a prescribed manner.

17. The integrated circuit as defined by claim 16, wherein the unitary body contains the plurality of RF circuitry channels, the plurality of RF ports, and the channel controller.

18. The integrated circuit as defined by claim 16, wherein each RF circuitry channel is associated with one of two polarizations such that a first sub-set of the plurality of RF circuitry channels is associated with a first polarization and a second sub-set of the plurality of RF circuitry channels is associated with a second polarization and wherein the channel controller is configured to selectively turn on and off the first and second sub-sets of the plurality of RF circuitry channels to provide improved polarization.

19. The integrated circuit as defined by claim 16, wherein the channel controller is configured to selectively turn on and off one or more sub-sets of the plurality of the RF circuitry channels to control the system to control the shape or magnitude of a beam.

20. The integrated circuit as defined by claim 16, wherein the channel controller is configured to selectively turn on and off one or more sub-sets of the plurality of the RF circuitry channels to distribute or combine signals from different RF circuitry channels.

21. The integrated circuit as defined by claim 16, wherein the channel controller is configured to selectively turn on and off one or more sub-sets of the plurality of the RF circuitry channels to control power consumption in a prescribed manner.

22. The integrated circuit as defined by claim 16, wherein a first channel of the plurality of RF circuitry channels has a first phase shifter configured to shift a first signal, and a second channel of the plurality of RF circuitry channels has a second phase shifter configured to shift a second signal,
the first and second phase shifters being selectable so that a combined signal of the shifted first and second signals has one of a plurality of different selectable polarizations.

23. The integrated circuit as defined by claim 1, wherein the flip-chip package is achieved using flip-chip chip scale package (FC-CSP).

24. The integrated circuit as defined by claim 1, wherein the flip-chip package is achieved using wafer level chip scale package (WLCSP).

25. The integrated circuit as defined by claim 1, wherein:
the interface surface includes a plurality of contact pads positioned with respect to a rectangular grid having 99 pad locations arranged as 9 rows designatable as rows A-I and 11 columns designatable as columns 1-11;
pads for the RF interfaces are at pad locations A3, A9, B1, B11, H1, H11, I3, I6, and I9; and
pads for the GND-RF interfaces are at pad locations A1, A2, A4, A8, A10, A11, C1, C11, G1, G11, I1, I2, I4, I5, I7, I8, I10, and I11.

26. The integrated circuit according to claim 25, wherein pads for analog supply signals are at pad locations within columns 4-8 of rows D-F inclusive and wherein each analog supply signal pad in row D, row F, column 4, and column 8 is separated by at least two ground pads from any other non-analog supply signal pad.

27. The integrated circuit according to claim 26, wherein pads for digital signals are at pad locations D1, D11, E1, E11, F1, and F11.

28. The integrated circuit according to claim 1, wherein the different polarizations include two polarizations that are orthogonal to one another.

29. The integrated circuit according to claim 1, wherein:
a first sub-set of the plurality of RF interfaces are configured to operate on signals having a first polarization; and
a second sub-set of the plurality of RF interfaces are configured to operate on signals having a second polarization different than the first polarization.

30. A phased array system comprising:
a plurality of beamforming elements; and
at least one beamforming integrated circuit comprising:
a unitary body having an interface surface, the body comprising a flip-chip package;
beamforming RF circuitry configured to process signals for transmitting and/or receiving RF signals; and a plurality of RF interfaces operatively coupled with the beamforming RF circuitry and on the interface surface, each of the RF interfaces operatively coupled with one of the beamforming elements and configured for communicating the signals to and/or from the beamforming RF circuitry, each of the RF interfaces on the interface surface being at or adjacent to an outer perimeter of the unitary body and positioned between two dedicated ground-RF (GND-RF) interfaces on the interface surface at or adjacent to said outer perimeter, wherein adjacent RF interfaces on the interface surface along said outer perimeter are separated and RF isolated from each other by at least two GND-RF interfaces along the outer perimeter and wherein at least two RF interfaces are configured to operate on signals having different polarizations.

31. The phased array system of claim 30, further comprising:
a substrate;
the plurality of beamforming elements on the substrate; and
the at least one beamforming integrated circuit on the substrate.

32. The phased array system of claim 31, wherein the beamforming elements are patch antennas.

33. The phased array system of claim 30, comprising a plurality of said beamforming integrated circuits.

34. The phased array system of claim 33, wherein each beamforming integrated circuit comprises two channels having different polarizations and wherein the phased array system comprises a controller configured to selectively turn on and off channels to improve polarization of the phased array system.

35. The phased array system of claim 30, wherein, for each of said beamforming integrated circuits, the outer perimeter is rectangular.

36. The phased array system of 35, wherein, for each of said beamforming integrated circuits, the outer perimeter includes a first edge and a second edge, wherein the plurality of RF interfaces include a first RF interface positioned on the first edge and a second RF interface positioned on the second edge, the first and second RF interfaces being configured to operate on signals having different polarizations.

37. The phased array system of claim 36, wherein, for each of said beamforming integrated circuits, the first edge and the second edge meet at a corner of the rectangle such that the first and second RF interfaces are adjacent RF interfaces along the outer perimeter and around the corner from one another.

38. The phased array system of claim 37, wherein, for each of said beamforming integrated circuits, one of the GND-RF interfaces associated with the first RF interface is positioned at the corner such that said GND-RF interface is along both the first edge and the second edge.

39. The phased array system of claim 30, wherein each of said beamforming integrated circuits further comprises a plurality of power interfaces on the interface surface that are radially inward of the RF interfaces.

40. The phased array system of claim 30, wherein, for each of said beamforming integrated circuits, the RF interfaces are spaced between 300 and 400 microns apart on the interface surface.

41. The phased array system of claim 30, wherein, for each of said beamforming integrated circuits, the RF isolation mitigates noise and cross-talk between RF interface pads at microwave and millimeter-wave frequencies.

42. The phased array system of claim 30, wherein each of said beamforming integrated circuits further comprises:
a plurality of RF circuitry channels for transmitting and/or receiving RF signals, each of the RF circuitry channels being operatively coupled with at least one of the RF interfaces; and
a channel controller operatively coupled with the plurality of RF circuitry channels, the channel controller being configured to selectively turn on and off one or more sub-sets of the plurality of the RF circuitry channels to control the system in a prescribed manner.

43. The phased array system of claim 42, wherein, for each of said beamforming integrated circuits, each RF circuitry channel is associated with one of two polarizations such that a first sub-set of the plurality of RF circuitry channels is associated with a first polarization and a second sub-set of the plurality of RF circuitry channels is associated with a second polarization and wherein the channel controller is configured to selectively turn on and off the first and second sub-sets of the plurality of RF circuitry channels to provide improved polarization.

44. The phased array system of claim 42, wherein, for each of said beamforming integrated circuits, the channel controller is configured to selectively turn on and off one or more sub-sets of the plurality of the RF circuitry channels to control the system to control the shape or magnitude of a beam.

45. The phased array system of claim 42, wherein, for each of said beamforming integrated circuits, the channel controller is configured to selectively turn on and off one or more sub-sets of the plurality of the RF circuitry channels to distribute or combine signals from different RF circuitry channels.

46. The phased array system of claim 42, wherein, for each of said beamforming integrated circuits, the channel controller is configured to selectively turn on and off one or more sub-sets of the plurality of the RF circuitry channels to control power consumption in a prescribed manner.

47. The phased array system of claim 42, wherein, for each of said beamforming integrated circuits, a first channel of the plurality of RF circuitry channels has a first phase shifter configured to shift a first signal, and a second channel of the plurality of RF circuitry channels has a second phase shifter configured to shift a second signal,
the system further having a combiner to receive the shifted first and second signals to produce a combined signal,
the first and second phase shifters being selectable so that the combined signal has one of a plurality of different selectable polarizations.

48. The phased array system of claim 30, wherein, for each of said beamforming integrated circuits, the flip-chip package is achieved using flip-chip chip scale package (FC-CSP).

49. The phased array system of claim 30, wherein, for each of said beamforming integrated circuits, the flip-chip package is achieved using wafer level chip scale package (WLCSP).

50. A method of controlling a system function, the method comprising:
energizing at least one beamforming integrated circuit comprising:
a unitary body having an interface surface, the body comprising a flip-chip package;
beamforming RF circuitry configured to process signals for transmitting and/or receiving RF signals, the beamforming RF circuitry having a plurality of RF circuitry channels for transmitting and/or receiving RF signals; and a plurality of RF interfaces operatively coupled with the beamforming RF circuitry and on the interface surface, the plurality of RF interfaces configured for communicating the signals to and/or from the beamforming RF circuitry, each of the RF interfaces on the interface surface being at or adjacent to an outer perimeter of the unitary body and positioned between two dedicated ground-RF (GND-RF) interfaces on the interface surface at or adjacent to said outer perimeter, wherein adjacent RF interfaces on the interface surface along said outer perimeter are separated and RF isolated from each other by at least two GND-RF interfaces along the outer perimeter and wherein at least two RF interfaces are configured to operate on signals having different polarizations;

determining a desired system function; and selectively turning on and off one or more sub-sets of the plurality of the RF circuitry channels to control the desired system function.

51. The method of claim 50, wherein the desired system function includes controlling the shape or magnitude of the beam.

52. The method of claim 50, wherein the desired system function includes distributing or combining signals from different beamforming integrated circuits in an AESA system.

53. The method of claim 50, wherein the desired system function includes controlling power consumption in a prescribed manner.

54. The method of claim 50, wherein energizing at least one beamforming integrated circuit comprises energizing a plurality of beamforming integrated circuits, each beamforming integrated circuit comprising two channels having different polarizations, and wherein selectively turning on and off one or more sub-sets of the plurality of the RF circuitry channels to control the desired system function comprises selectively turning on and off channels to provide improved polarization.

55. The method of claim 54, wherein the different polarizations include two polarizations that are orthogonal to one another.

56. The method of claim 50, wherein selectively turning on and off one or more sub-sets of the plurality of the RF circuitry channels occurs during transmission or receipt of a beam.

57. The method of claim 50, wherein selectively turning on and off one or more sub-sets of the plurality of the RF circuitry channels occurs before transmission or receipt of a beam.

58. The method of claim 50, wherein a first RF circuitry channel of the plurality of RF circuitry channels has a first selectable phase shifter configured to shift a first signal, and a second RF circuitry channel of the plurality of RF circuitry channels has a second selectable phase shifter configured to shift a second signal, the method further comprising:

selecting the phase shift of the first signal by selecting the first phase shifter;

selecting the phase shift of the second signal by selecting the selecting phase shifter;

receiving, at a combiner, the shifted first and second signals from the first and second channels, combining, using the combiner, the first and second shifted signals to produce a combined signal, the first and second phase controllers being selected so that the combined signal has one of a plurality of different selectable polarizations.

59. A method of transmitting a signal using beamforming, the method comprising:

providing a beamforming integrated circuit comprising:

a unitary body having an interface surface, the body comprising a flip-chip package;

beamforming RF circuitry configured to process signals for transmitting and/or receiving RF signals, the beamforming RF circuitry having a plurality of RF transmit channels, each of the RF transmit channels having a first input configured to receive a signal, a phase controller configured to shift the phase of the first signal, an amplifier configured to amplify the signal, and an output configured to forward the signal to a transmit element of the AESA system, the integrated circuit also having at least one DC power input; and a plurality of RF interfaces operatively coupled with the beamforming RF circuitry and on the interface surface, the plurality of RF interfaces configured for communicating the signals to and/or from the beamforming RF circuitry, each of the RF interfaces on the interface surface being at or adjacent to an outer perimeter of the unitary body and positioned between two dedicated ground-RF (GND-RF) interfaces on the interface surface at or adjacent to said outer perimeter, wherein adjacent RF interfaces on the interface surface along said outer perimeter are separated and RF isolated from each other by at least two GND-RF interfaces along the outer perimeter and wherein at least two RF interfaces are configured to operate on signals having different polarizations;

receiving an energizing signal though the power input; and operating the integrated circuit at a quiescent current with the received energizing signal so that the integrated circuit operates at an RF power value within a prescribed range of RF power values, the RF power value not exceeding about 10 dBm in output P1 dB, the RF power value that is greater than about −3 dBm in output P1 dB.

60. The method of claim 59, wherein the RF power value is between X dBm and Y dBm, where X is between 1-9.7 and Y is between 1-9.8, and X<Y for the selected values of X and Y.

61. The method of claim 60, wherein the RF power value is between one or more of the following ranges:

4-9 dBm,
4-8 dBm,
4-7 dBm,
4-6 dBm,
4-5 dBm.

62. The method of claim 59, wherein the quiescent DC power is between about 50 and about 80 mW for each channel.

63. The method of claim 59, wherein the different polarizations include two polarizations that are orthogonal to one another.

* * * * *